US007604339B2

(12) United States Patent
Yamashita et al.

(10) Patent No.: US 7,604,339 B2

(45) Date of Patent: Oct. 20, 2009

(54) INK JET RECORDING METHOD AND INK JET RECORDING APPARATUS

(75) Inventors: Kunichi Yamashita, Ebina (JP); Ken Hashimoto, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 532 days.

(21) Appl. No.: 11/054,263

(22) Filed: Feb. 9, 2005

(65) Prior Publication Data

US 2006/0066661 A1 Mar. 30, 2006

(30) Foreign Application Priority Data

Sep. 24, 2004 (JP) ............................ 2004-278039

(51) Int. Cl.
*C09D 11/00* (2006.01)

(52) U.S. Cl. .................................... 347/100; 106/31.13

(58) Field of Classification Search ................. 347/100; 106/31.13

See application file for complete search history.

(56) References Cited

U.S. PATENT DOCUMENTS 5,767,876 A * 6/1998 Koike et al. .................... 347/43
6,053,596 A * 4/2000 Nakano et al. ................ 347/15
6,123,411 A * 9/2000 Inui et al. ..................... 347/43
6,394,569 B1 * 5/2002 Zeman ........................ 347/15
6,474,778 B1 11/2002 Koitabashi et al.
2002/0012035 A1 * 1/2002 Mouri et al. ................ 347/100
2002/0054187 A1 * 5/2002 Kato et al. .................... 347/43
2002/0180834 A1 * 12/2002 Silverbrook ................. 347/42
2004/0046832 A1 * 3/2004 Kuwahara .................... 347/43
2004/0244645 A1 * 12/2004 Doi et al. ................. 106/31.58

FOREIGN PATENT DOCUMENTS

JP 8-216393 8/1996
JP 08216393 A * 8/1996
JP 2667401 6/1997
JP 2001-294788 10/2001
JP 2001294788 A * 10/2001
JP 2004-237619 8/2004

* cited by examiner

*Primary Examiner*—Manish S Shah
*Assistant Examiner*—Laura E Martin
(74) *Attorney, Agent, or Firm*—Fildes & Outland, P.C.

(57) ABSTRACT

The present invention provides an ink jet recording method and an ink jet recording apparatus for recording an image on a recording medium by using an ink containing a coloring agent and a liquid composition containing a component for coagulating and/or thickening the ink. The method is characterized in that the ink and the liquid composition are ejected onto the recording medium such that they are not in contact with each other on the recording medium immediately after the ejection and come into contact when a certain period of time has lapsed since the application.

18 Claims, 15 Drawing Sheets

INK JET RECORDING METHOD AND INK JET RECORDING APPARATUS

CROSS-REFERENCE TO RELATED APPLICATION

This application claims priority under 35 U.S.C. 119 from Japanese Patent Application No. 2004-278039, the disclosure of which is incorporated by reference herein.

BACKGROUND OF THE INVENTION

1. Field of the Invention

The present invention relates to an ink jet recording method and an ink jet recording apparatus.

2. Description of the Related Art

An ink jet method, which ejects an ink from an opening of a nozzle, a slit, or a porous film, is compact and low-cost and therefore has been widely used in various printers. Among such an ink jet method, a piezo ink jet method using deformation of a piezoelectric element to eject an ink, and a thermal ink jet method using thermal energy to boil and thereby eject an ink can print high-resolution images at high speed.

In the field of ink jet printers, one of the important tasks is high-speed printing of a high-quality image on plain paper. In ordr to achieve this task, an ink jet recording method has been proposed which includes the steps of applying a liquid containing a compound with a cationic group onto a recording medium, and applying an ink containing an anionic dye to form an image immediately after the liquid penetrates into the recording medium, disappears from the surface of the recording medium, and remains in the recording medium (see Japanese Patent No. 2,667,401)

Further, to achieve rapid drying, high optical density, and high image quality, a color ink set has been proposed in which a black ink contains water and a water-soluble solvent and shows a drying time of 5 seconds or less on plain paper, and each of color inks contains a coloring agent, water, a water-soluble solvent, and a coagulating agent for coagulating a component of the black ink and shows a penetrating time of 5 seconds or less into plain paper (see Japanese Patent Application Laid-Open (JP-A) No. 2001-294788)

Furthermore, in view of preventing bleeding and feathering, an U recording apparatus has been proposed which has an ink discharge portion capable of applying a particular color ink while changing the amount thereof, a discharge portion for discharging a processing liquid containing a component for coagulating the ink, and a control unit for applying a larger amount of the processing liquid to an image boundary portion and applying a relatively smaller amount of the processing liquid to at least a peripheal portion thereof (see JP-A No. 8-216393)

However, in the above apparatus, bleeding (sometimes referred to as feathering) is not sufficiently reduced in some cases depending on the combination of the ink and the processing liquid (an ink or a liquid composition containing a coagulating agent).

In recent years, ink jet recording apparatuses capable of printing at higher speeds have been developed, and thus there is increasing demand for improving the drying speed of inks so as to be able to handle the higher printing speed.

Accordingly, technologies for improving not only drying time and fixation, but also image characteristics such as optical density, bleeding, and intercolor bleeding, have been required.

Thus, there is demand for an ink jet recording method and an ink jet recording apparatus, which can achieve satisfactory drying time, fixation, and optical density, and can suppress intercolor bleeding, image density unevenness, and feathering in high-speed printing.

SUMMARY OF THE INVENTION

To satisfy the above demand, the inventors have invented the following invention.

A first aspect of the invention is an ink jet recording method comprising recording an image on a recording medium with an ink containing a coloring agent and a liquid composition containing a component for coagulating and/or thickening the ink, wherein the ink and the liquid composition are applied to the recording medium such that the ink and the liquid composition are not in contact with each other on the recording medium immediately after the application and come into contact with each other when a certain period of time has elapsed since the application.

A second aspect of the invention is an ink jet recording apparatus comprising a recording head for applying an ink containing a coloring agent and a liquid composition containing a component for coagulating and/or thickening the ink, to a recording medium, and a unit for controlling the positions of droplets of the ink and the liquid composition such that the ink and the liquid composition are not in contact with each other on the recording medium immediately after the application and come into contact with each other when a certain period of time has lapsed since the application.

A third aspect of the invention is an ink jet recording apparatus, comprising a recording head for applying an ink containing a coloring agent and a liquid composition containing a component for coagulating and/or thickening the ink, to a recording medium, and a unit for controlling the positions of droplets of the ink and the liquid composition such that the ink is applied to an image area and is not applied to a non-image area, the liquid composition is applied to the non-image area, and the ink or the liquid composition is applied to a boundary portion of the image area or a boundary portion of the non-image area under one of the following conditions (1) to (4):

(1) the liquid composition is not applied to the boundary portion of the non-image area;

(2) the application amount of the liquid composition in the boundary portion is smaller than that in a portion other than the boundary portion;

(3) the application amount of the ink in the boundary portion is smaller than that in a portion other than the boundary portion; and (4) the application amount of the ink in the boundary portion is smaller than that in a portion other than the boundary portion, and the application amount of the liquid composition in the boundary portion is smaller than that in a portion other than the boundary portion.

The invention can provide an ink jet recording method and an ink jet recording apparatus which can achieve satisfactory drying time, fixation, and optical density, can suppress intercolor bleeding, image density unevenness, and feathering even in high-speed printing.

BRIEF DESCRIPTION OF THE DRAWINGS

Preferred embodiments of the inventuion will be described in detail based on the following figures, wherein.

DETAILED DESCRIPTION OF THE INVENTION

Figure 1A:
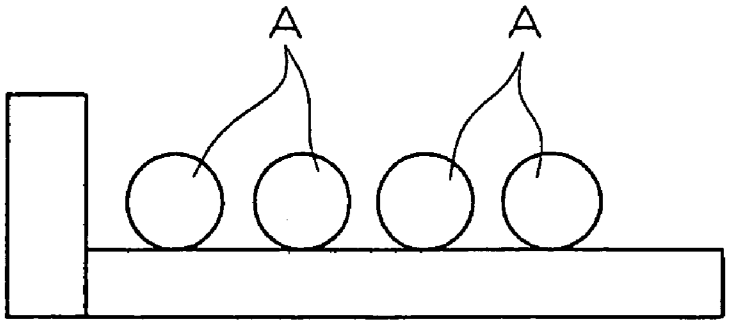
FIGS. 1A to 1C are schematic views showing printing patterns of a conventional ink and a conventional liquid composition.

Hereinafter, the invention will be described in detail.

1. Ink Jet Recording Method

1-1. Ejecting Position

In an ink jet recording method according to a first embodiment of the invention, an image is recorded on a recording medium with an ink containing a coloring agent and a colorless or unicolor liquid composition containing a component for coagulating and/or thickening the ink. Here, the ink and the liquid composition are ejected onto the recording medium such that the ink and the liquid composition are in contact with each other on the recording medium immediately after the ejecting and come into contact with each other when a certain period of time has lapsed since the ejecting.

It is known that image characteristics including optical density, bleeding, and intercolor bleeding can be improved by using an ink in combination with a liquid composition for thickening or coagulating the ink. The mechanism thereof is thought to include the following two functions. One is coagulating property (i) in which coloring agent particles in the ink are caused to rapidly aggregate, and separate from an aqueous medium such as water and a water-soluble solvent. The other is permeability (ii) in which only the aqueous medium is caused to permeate a recording medium.

When coagulating property is sufficiently larger than permeability, image quality is sufficiently improved but drying time tends to lengthen. On the other hand, when permeability is sufficiently larger than coagulating property, drying time shortens but image quality is insufficiently improved.

In recent years, ink jet recording apparatuses capable of printing at higher speeds have been developed, and there is an increasing demand for drying speed of inks being shortened so that the inks can be used in such an ink jet recording apparatus. In response to the demand, an ink having high permeability tends to be used to improve the drying speed. However, the ink having high permeability is likely to cause bleeding in boundary portions (outlines) of an image and intercolor bleeding.

In the case of paper which is not easily permeated, drying speed is not improved by increasing the permeability of the ink. When a large amount of undried coloring agent is present on a recording medium, the coloring agent adheres to and accumulates on a paper feeding unit such as a paper conveying roller, and is re-transferred to the recording medium, causing stains on an image.

To overcome these problems, a method has been proposed in which a liquid composition and an ink are applied to a recording medium such that droplets of the liquid composition and those of the ink overlap each other and such that a relatively large amount of the liquid composition and a relatively small amount of the ink are applied in image boundary portions (see JP-A-8-216393).

However, it has been found that, in this method, the ink flows toward outside of the liquid composition droplets in the image boundary portions, causing feathering. The reason for this is thought to be as follows. The method is intended to improve coagulation of the coloring agent by reducing the amount of the ink and by increasing the amount of the coagulating agent. However, in the image boundary portions, the ink is ejected to a region of a recording medium in which a large amount of the liquid composition and in turn an excessive amount of moisture exist. Therefore, it is difficult that the ink penetrates the recording medium, causing feathering.

Figure 1B:
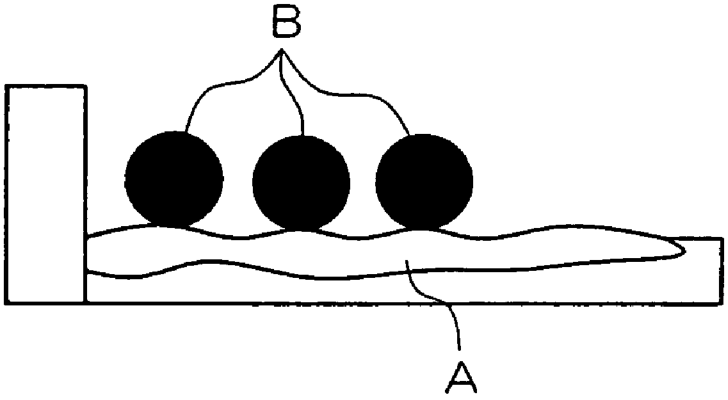
Figure 1C:
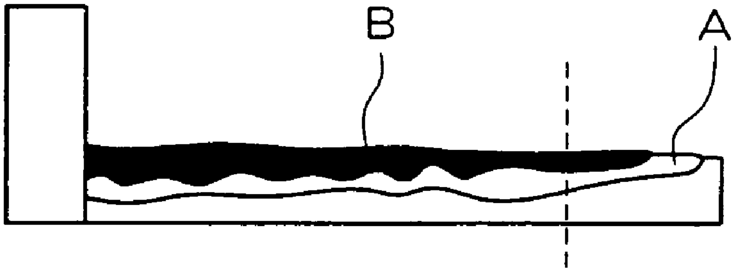

Moreover, it has been found that, when the liquid composition is applied to a non-image area outside and adjacent to an image area so that the liquid composition is in contact with the ink, the ink spreads on the non-image area due to the contact between the liquid composition and the ink and an image boundary portion undesirably spreads outward, causing feathering. This phenomenon is schematically shown in FIGS. 1A to 1C. In FIGS. 1A to 1C, "A" represents a liquid composition, "B" represents an ink, and a dotted line represents the boundary between an image area and a non-image area. "A", "B", and a dotted line in each of FIGS. 2A to 2C and 3A to 3C have the same meanings. These diagrams are views obtained by looking at recording media in the horizontal direction.

Figure 2A:
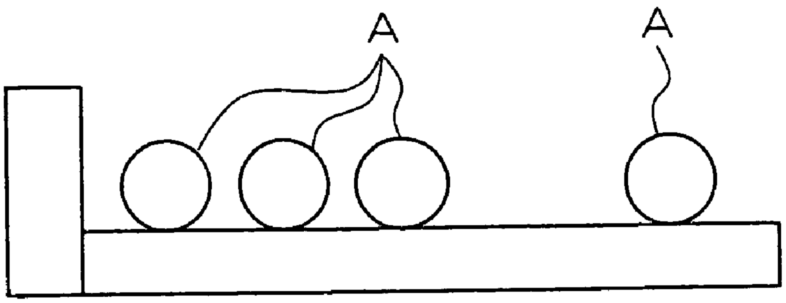
FIGS. 2A to 2C are schematic views showing printing patterns of an ink and a liquid composition used in the invention.
Figure 2B:
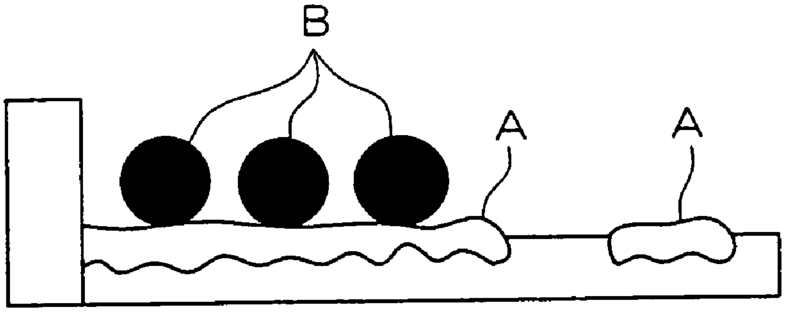
Figure 2C:
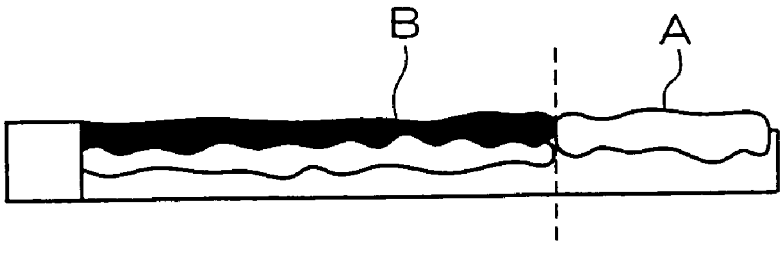

The inventors intensely researched in consideration of these studies, and have found the following. Optical density, bleeding, and intercolor bleeding can be improved and drying time of an ink can be shortened, when a liquid composition is applied to a recording medium such that the liquid composition does not exist in a non-image area outside and adjacent to an image area immediately after the application but comes into contact with the ink when a certain period of time has lapsed since the application. This phenomenon is schematically shown in FIGS. 2A to 2C. In the ink jet recording method of the invention, the liquid composition is not ejected onto a non-image area adjacent to an image area, and is ejected onto areas outside such a non-image area. However, when a certain period of time has lapsed since the application, it is neccesarry that the liquid composition applied to the outside areas has spread on the recording medium and comes into contact with the ink.

The details of the mechanism are not clear, but are thought to be as follows. As time lapses, an aqueous medium contained in the ink penetrates the recording medium and also spreads on the recording medium. Therefore, the coloring agent contained in the ink remains on the recording medium, with the amount of the aqueous medium remaining on the recording medium moderately reduced. Meanwhile, the liquid composition spreads over time, comes into contact with the ink which is in such a state, and aggregates the coloring agent particles. Therefore, the ink is not adversely influenced by the liquid composition and does not spread outward. Thus, when a part of the ink applied to the recording medium has penetrated the recording medium, the coagulating agent of the liquid composition comes into contact with the ink remaining on the recording medium. Accordingly, image characteristics, such as prevention of feathering, are improved while maintaining high drying speed.

The positions of droplets of the ink and the liquid composition immediately after ejecting can be checked by ejecting them onto glossy paper. In the method of the invention, droplets of the liquid composition are ejected onto positions on the glossy paper in which positions they are not in contact with droplets of the ink. The glossy paper is KASSAI SHASHIN SHIAGE ADVANCE available from Fuji Photo Film Co., Ltd.

When a certain period of time has lapsed since ejecting, it is necessary that the ink and the liquid composition come into contact with each other. To check whether they come into contact with each other due to lapse of time, they are ejected onto an objective recording medium such as plain paper. Time from ejecting to a time when the ink and the liquid composition have come into contact with each other is not particularly limited, but is preferably 10 seconds or more, and more preferably 30 seconds or more.

In the ink jet recording method of the invention in which an ink containing a coloring agent is applied to an image area, and a liquid composition containing a component for coagulating and/or thickening the ink is applied to a non-image area so as to record an image on a recording medium, it is preferable that the ink and/or the liquid composition is applied to boundary portions of the image area and the non-image area under one of the following conditions (1) to (4).

(1) The liquid composition is not applied to the boundary portion of the non-image area.

(2) The amount of the liquid composition applied to the boundary portion of the non-image area is smaller than that applied to a portion other than the boundary portion.

(3) The amount of the ink applied to the boundary portion of the image area is smaller than that appleid to a portion other than the boundary portion.

(4) The amount of the ink applied to the boundary portion of the image area is smaller than that applied to a portion other than the boundary portion, and the amount of the liquid composition applied to the boundary portion of the non-image area is smaller than that applied to a portion other than the boundary portion.

The size of the boundary portions of the image area and the non-image area depend on the material of a recording medium. The boundary portions include a part of the image area which part extends inward from the boundary between the image area and the non-image area, and a part of the non-image area which part extends outward from the boundary. The total width of the boundary portions of the image and non-image areas generally corresponds to that of one to ten dots of the ink and preferably corresponds to that of one to five dots.

Under the conditions (1) to (4), the ink and the liquid composition are not in contact with each other immediately after application. However, when a certain period of time has lapsed since the application, the liquid composition ejected onto a portion outside the image area has spread on the recording medium and then comes into contact with the ink. Under the conditions (2) to (4), the positions of droplets of the ink and the liquid composition applied are not changed, but the amount of the ink applied to the bounradry portion of the image area and/or that of the liquid composition applied to the bounrady portions is decreased to reduce the size of droplets. Thereby, the ink and the liquid composition are not in contact with each other immediately after application. Not only controlling amounts of the ink and the liquid composition, but also controlling surface tensions and/or viscosities thereof are effective in controlling droplet sizes thereof.

Further, one of the conditions (2) to (4) can be combined with controlling positions of ink and liquid composition droplets to allow the ink and the liquid composition not to be in contact with each other immediately after application and, when a period of time has lapsed since the application, to come into contact with each other.

The conditions (1) to (4) are schematically shown in FIGS. 4 to 7. FIGS. 4 to 7 are views showing droplets of the ink and the liquid composition immediately after application of them and obtained by looking at the recording medium such that the line of sight is perpendicular to the surface thereof. In FIGS. 4 to 7, white circles represent droplets of the liquid composition and black circles represent those of the ink.

Figure 4:
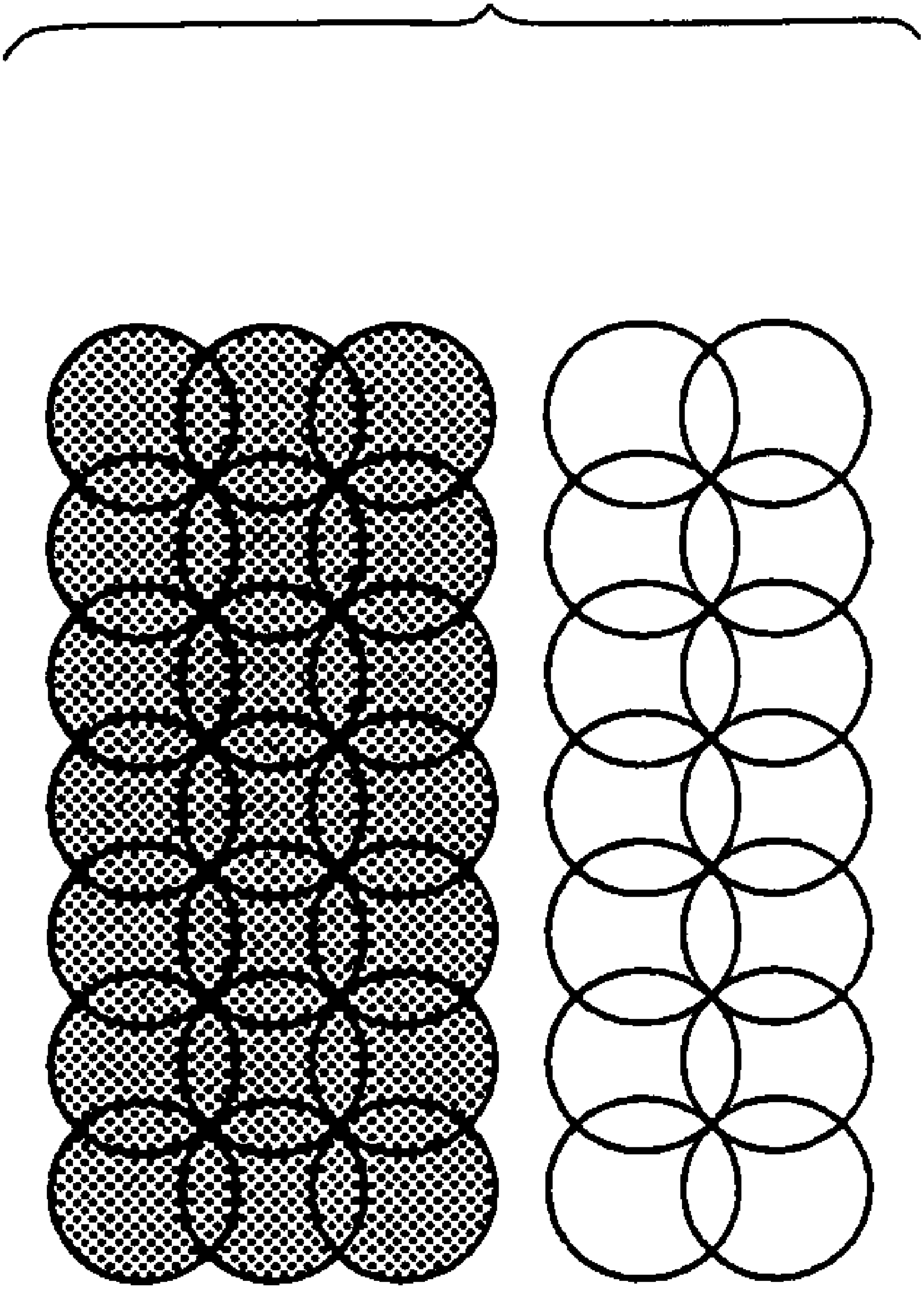
FIG. 4 is a schematic view showing positions and amounts of ejected droplets of an ink and a liquid composition in an embodiment of the invention.

In FIG. 4, the positions of applied droplets of the ink and the liquid composition are controlled to dispose space created by leaving one dot unformed between droplets of the ink which are nearest to the liquid composition droplets and droplets of the liquid composition which are nearest to the ink droplets.

Figure 5:
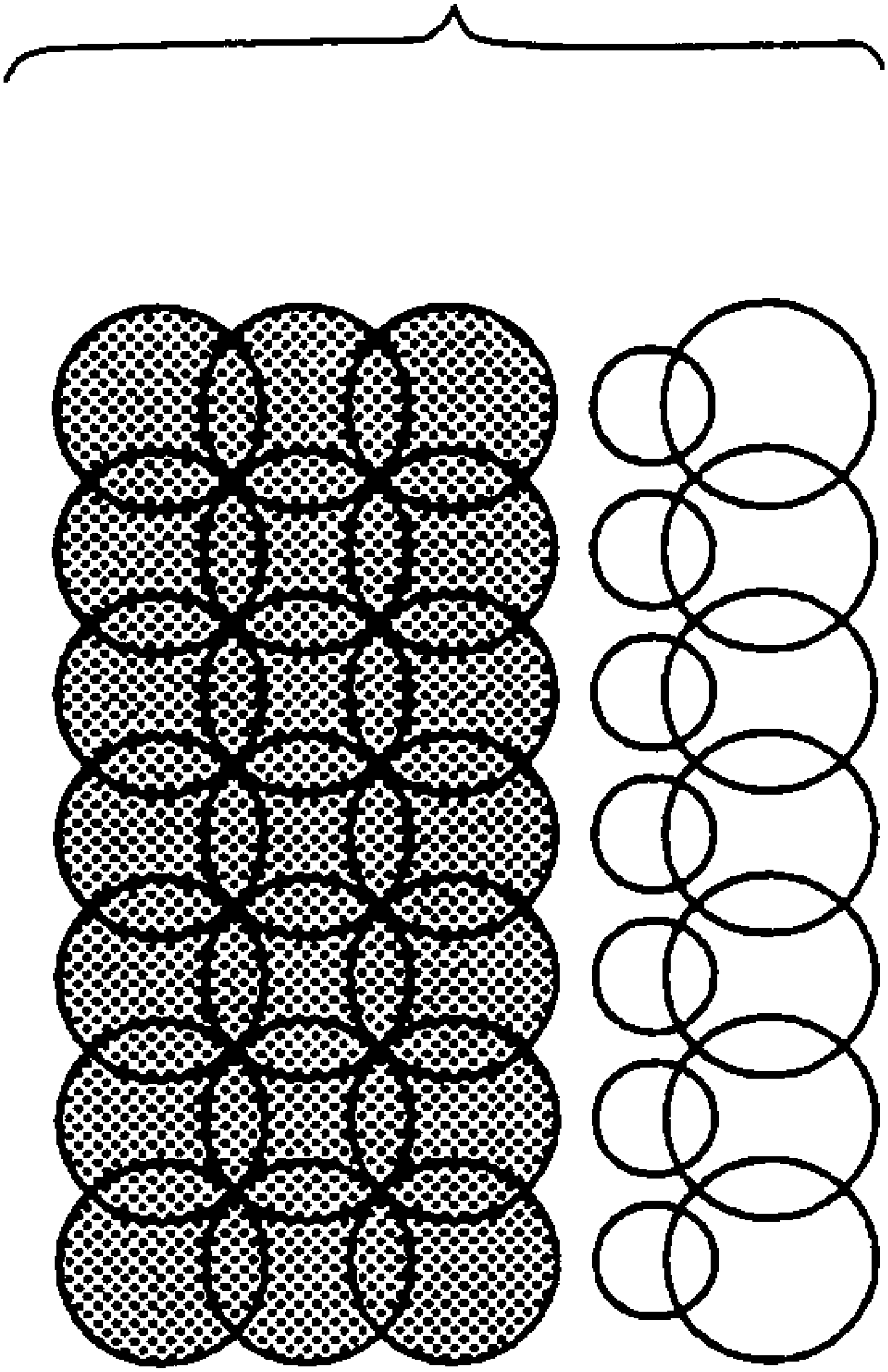
FIG. 5 is a schematic view showing positions and amounts of ejected droplets of an ink and a liquid composition in another embodiment of the invention.

In FIG. 5, the positions of applied droplets of the ink and the liquid composition are not changed, but the amount of each of droplets of the liquid composition which are nearest to the ink droplets is so controlled as to dispose space between the ink and the liquid composition. The amount of the liquid composition droplets nearest to an ink image area is decreased to reduce the size of the droplets, thereby disposing space between the ink and the liquid composition.

Figure 6:
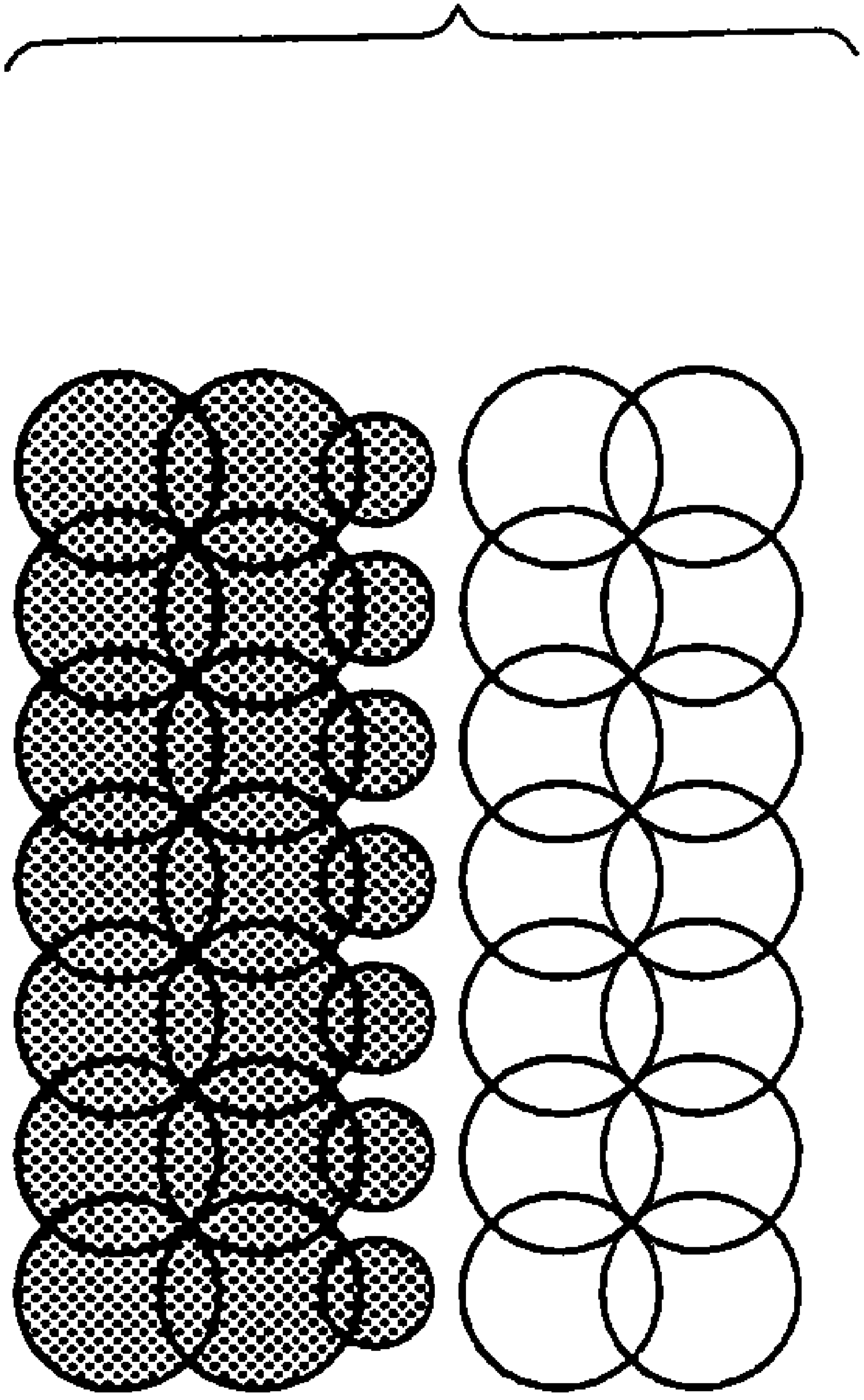
FIG. 6 is a schematic view showing positions and amounts of ejected droplets of an ink and a liquid composition in still another embodiment of the invention.

As in FIG. 5, the positions of ink and liquid composition droplets are not changed in FIG. 6. However, the amount of the ink droplets nearest to a liquid composition area is lowered to reduce the size of the droplets, thereby disposing space between the ink and the liquid composition.

Figure 7:
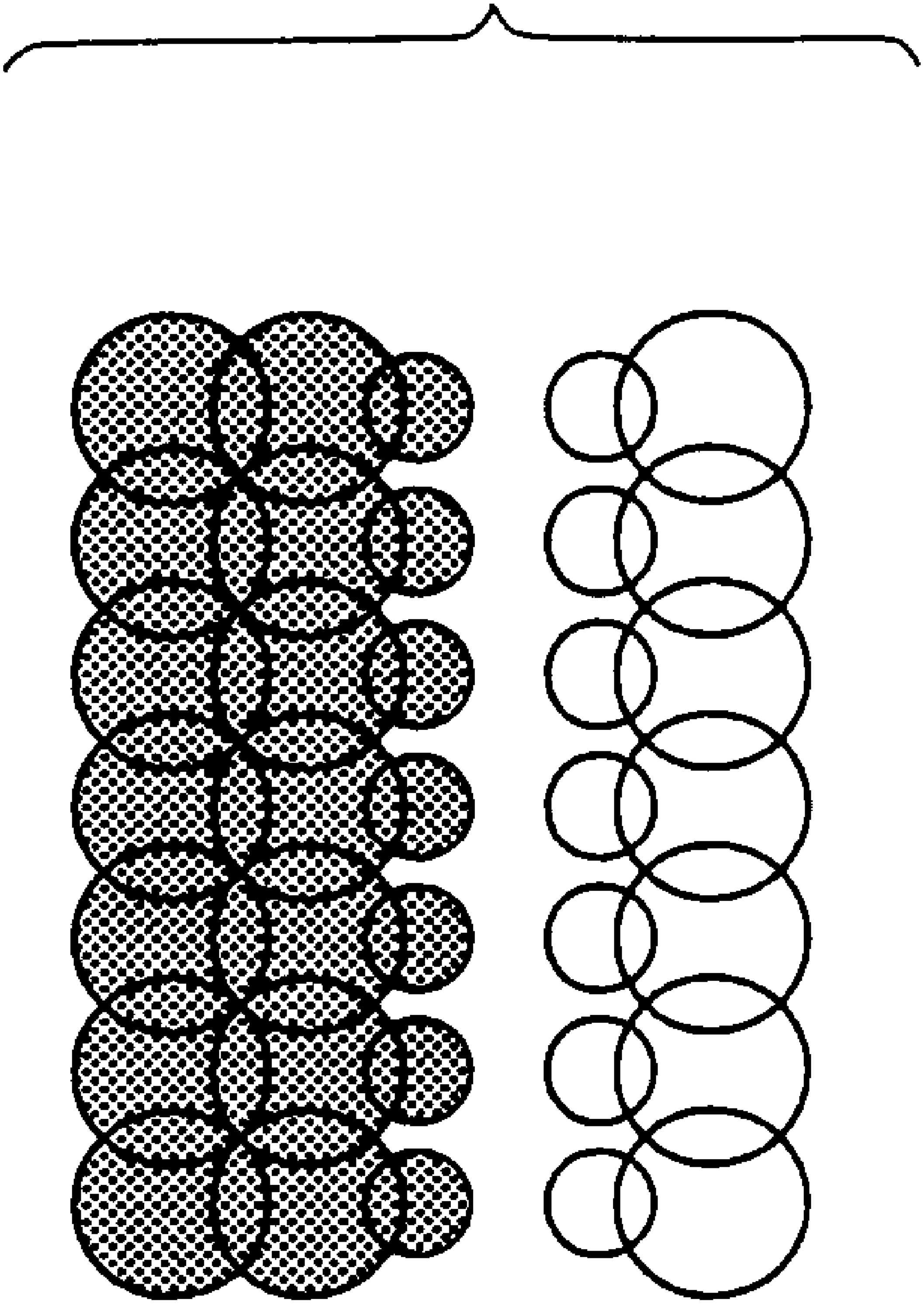
FIG. 7 is a schematic view showing positions and amounts of applied ink and liquid composition droplets in still another embodiment of the invention.

In FIG. 7, methods of applying an ink and a liquid composition shown in FIGS. 5 and 6 are combined. The amounts of droplets of the liquid composition and the ink are lowered in the boundary portions of an ink image area and a liquid composition area to reduce the sizes of the droplets, thereby disposing space between the ink and the liquid composition.

Figure 8A:
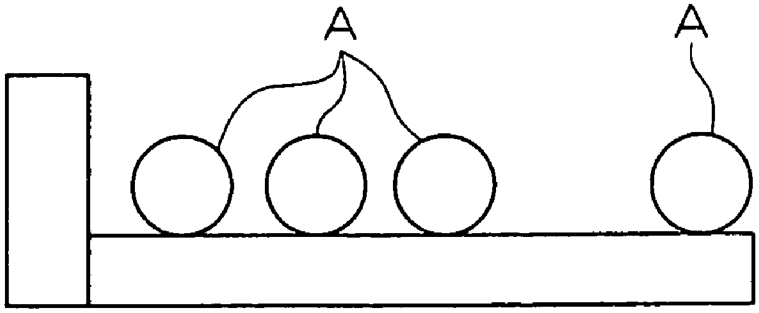
FIGS. 8A to 8C are schematic views showing printing patterns of an ink and a liquid composition used in an embodiment of the invention.
Figure 8B:
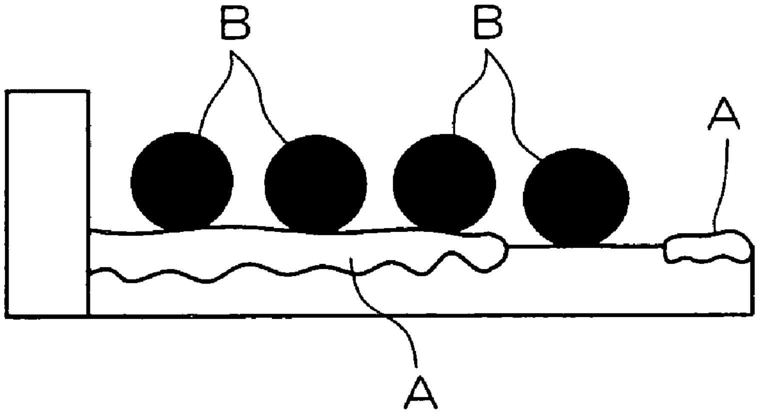
Figure 8C:
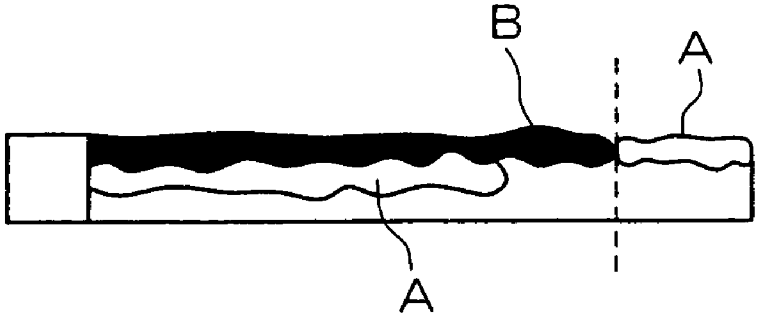

Under the condition (1), it is more preferable not to apply the liquid composition to the boundary portion of the image area. This is schematically shown in FIGS. 8A to 8C.

Figure 3A:
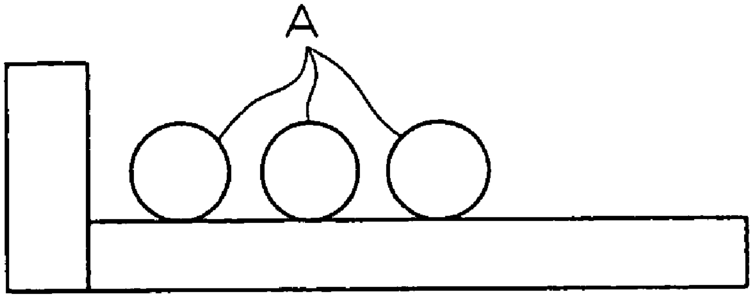
FIGS. 3A to 3C are schematic views showing other printing patterns of the conventional ink and liquid composition.
Figure 3B:
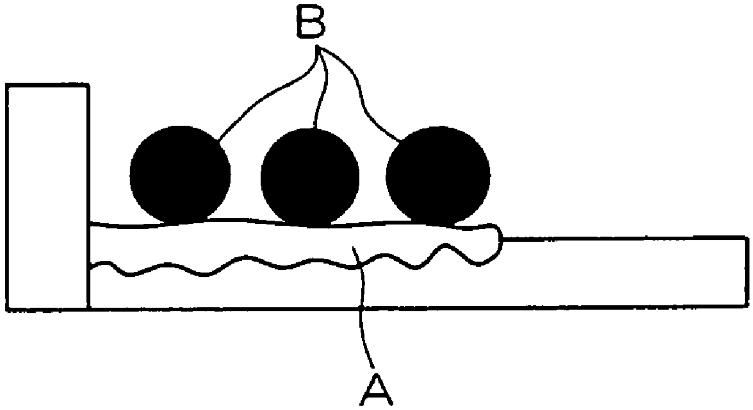
Figure 3C:
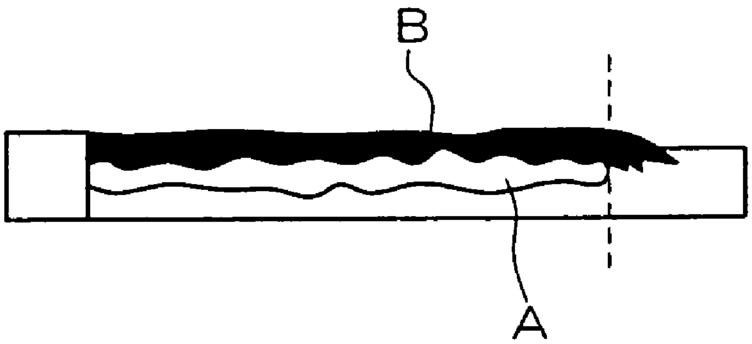

Further, by applying the liquid composition to an image area, not only feathering and drying speed of the ink, but also image density are improved. However, it has been found that, when the liquid composition or the ink is excessively applied to the boundary portions of the image area and a non-image area, the ink tends to diffuse in the planar direction of the recording medium, extend beyond the liquid composition and spread outside the image area, whereby feathering is likely to occur. This phenomenon is schematically shown in FIGS. 3A to 3C. The conditions (1) to (4) are remarkably effective in preventing this phenomenon. In FIGS. 4 to 7, the liquid composition applied to the image area is omitted.

In the invention, when the liquid composition is aplied to an image area to which the ink is applied, and plural droplets of the liquid composition are applied to one droplet of the ink in the image area, the positions of the droplets of the liquid composition are preferably different from each other. The positions of the droplets of the liquid composition may be shifted by a method of controlling a printing pattern of the liquid composition on the basis of image data, or by a method of controlling the direction of the droplets, such as a method of controlling paper conveyance or a multi-pass recording method including a two-pass recording method.

1-2. Application Amount

In the ink jet recording method of the invention, given $D_{ink}$ represents the weight of a droplet of the ink and $D_{liq}$ represents the weight of a droplet of the liquid composition, $D_{ink}$ and $D_{liq}$ preferably satisfy the following expression (1). Further, given $W_{ink}$ represents the weight of the ink applied per unit area and $W_{liq}$ represents the weight of the liquid composition applied per unit area, $W_{ink}$ and $W_{liq}$ preferably satisfy the following expression (2).

$$0.15<D_{liq}/D_{ink}<1.0 \quad \text{Expression (1)}$$

$$0.15<W_{liq}/W_{ink}<1.0 \quad \text{Expression (2)}$$

When the expressions (1) and (2) are satisfied, feathering is further improved, and unevenness of solid printing is improved. It is preferable that the expressions (1) and (2) are satisfied in both the boundary portions and the non-boundary portions.

It is preferable to apply the liquid composition to the non-boundary portion of the image area. This is because not only feathering and drying speed of the ink, but also image density are improved, as described above. When the liquid composition is applied to such a portion in a single-sided printing mode, the mass ratio of the application amount of the ink per unit area to that of the liquid composition per unit area is preferably about 100:5 to about 100:100, more preferably about 100:5 to about 100:50, and still more preferably about 100:10 to about 100:20. When the mass ratio of the application amount of the liquid composition per unit area to that of the ink per unit area is less than 5/100, the ink is insufficiently coagulated, and optical density deteriorates, and bleeding and intercolor bleeding occur in some cases. On the other hand, when the mass ratio of the application amount of the liquid composition per unit area to that of the ink per unit area is more than 100/100, curling and cockling of the recording medium may deteriorate.

When the liquid composition is applied to the non-bandary portion of the image area in a double-sided printing mode, the mass ratio of the application amount of the ink per unit area to that of the liquid composition per unit area is preferably about 100:1 to about 100:50, more preferably about 100:1 to about 100:25, and still more preferably about 100:2 to about 100: 15. When the mass ratio of the application amount of the liquid composition per unit area to that of the ink per unit area is less than 1/100, the ink is insufficiently coagulated, and optical density deteriorates, and bleeding and intercolor bleeding occur in some cases. On the other hand, when the mass ratio of the application amount of the liquid composition per unit area to that of the ink per unit area is more than 25/100, stains on an image may occur in high-speed, double-sided printing.

In order to suppress the ink undesirably extending beyond the liquid composition, it is preferable that the amount of the ink applied to the boundary portion is smaller than that applied to a non-boundary portion. In an image area, the amount of the ink applied to the boundary portion is preferably about 10 to about 95%, and more preferably about 20 to about 70% of that applied to the non-boundary portion.

In order to prevent feathering, it is preferable that, in the image area, the amount of the liquid composition applied to the boundary portion is smaller than that applied to the non-boundary portion. In the image area, the amount of the liquid composition applied to the boundary portion is preferably about 10 to about 95%, and more preferably about 20 to about 70% of that applied to the non-boundary portion.

In a non-image area, it is preferable that (1) the liquid composition is not applied to the boundary portion. Alternatively, (2) the liquid composition is preferably applied to the boundary portion of the non-image area such that the amount of the liquid composition applied to the boundary portion is smaller than that applied to a non-boundary portion of the non-image area. This is because feathering can be prevented. The amount of the liquid composition applied to the boundary portion is preferably about 0 to about 95%, and more preferably about 0 to about 70% of that applied to the non-boundary portion.

The application amount per unit area may be lowered by reducing the amount of each droplet or by reducing the number of droplets without decreasing the amount of each droplet. Both methods may be used for the ink and the liquid composition.

The number of dots of the liquid composition per unit area is preferably larger than that of the ink per unit area. When the expression (2) is satisfied in this case, the application amount of the liquid composition per unit area is smaller than that of the ink per unit area, and the number of dots of the liquid composition per unit area is larger than that of the ink per unit area. That is, it is preferable to eject a large number of small droplets of the liquid composition. The expression (2) is also satisfied by ejecting a reduced number of large droplets, but it is preferable to eject a large number of small droplets of the liquid composition as described above. This is because the liquid composition rapidly penetrates and diffuses in, and uniformly adheres to a recording medium to achieve good uniformity of image quality.

In the invention, the application amount of each of the ink and the liquid composition is preferably about 25 ng or less per pixel. The application amount of the ink per pixel is more preferably about 0.5 to about 20 ng, and still more preferably about 2 to about 8 ng. The application amount of the liquid composition per pixel is more preferably about 0.5 to about 15 ng, and still more preferably about 0.5 to about 4 ng. When the application amount of each of the ink and the liquid composition per pixel is more than 25 ng, bleeding occurs or drying time of the coloring agent lengthens in some cases. The reason of occurrence of bleeding is thought to be as follows. The contact angle of each of the ink and the liquid composition with respect to a recording medium depends on the amount of a droplet. Therefore, as the amount of a droplet increases, the droplet tends to more easily spread on paper.

In the invention, the term "(one) pixel" means a minimum of printing units obtained by resolving an image, and the size of the minimum printing unit mainly depends on the resolution of a print head and the resolution of a recording medium in a recording medium feeding direction. Therefore, a product of the application amount of an ink per pixel by the number of pixels per unit area is the total application amount of the ink necessary to form the unit area, and a product of the application amount of the liquid composition per pixel by the number of pixels per unit area is the total application amount of the liquid composition necessary to form the unit area.

1-3. Ink Jet Recording Method

The ink jet recording method of the invention is preferably a thermal ink jet recording method or a piezo ink jet recording method to prevent bleeding and intercolor bleeding. These recording methods can precisely control the positions of pixels and can achieve a high printing density. Further, the piezo ink jet method can eject a high-viscosity liquid. The high-viscosity liquid can prevent an ink from spreading on the surface of a recording medium, or can be prevented from spreading on the surface of the recording medium, whereby bleeding and intercolor bleeding are improved.

The liquid composition and the ink are applied (ejected) onto a recording medium in this order. When the liquid composition is applied before the ink is applied, the components of the ink can be efficiently coagulated. The ink may be applied anytime as long as it is applied after the application of the liquid composition. The ink is preferably applied at most 0.1 second after the application of the liquid composition.

2. Ink

The details of the ink used in the ink jet recording method of the invention will be described below.

The ink used in the invention contains at least a coloring agent, and generally further contains a water-soluble solvent and water. These components will be described in detail, respectively.

2-1. Coloring Agent

The coloring agent of the ink may be a dye or a pigment. A pigment is particularly preferable. The reason for this is thought to be that a pigment is more easily coagulated at the time that it is mixed with the liquid composition than a dye. The pigment is preferably a pigment dispersed by a high-molecular dispersing agent (a high-molecular substance described later), a self-dispersible pigment, a pigment coated with a resin, or a polymer-grafted pigment.

The pigment for use in the invention may be an organic pigment or an inorganic pigment. Examples of a black pigment include carbon black pigments such as furnace black, lamp black, acetylene black, and channel black. A black pigment, at least one of pigments of three primary colors of cyan, magenta and yellow, at least one of pigments of particular colors such as red, green, blue, brown and white, a metallic pigment of gold or silver color, a colorless or light-colored extender pigment, and/or a plastic pigment may be used in the invention. Also, particles having a dye or a pigment fixed on the surface of a core of silica, alumina, or a polymer bead, an insoluble lake of a dye, a colored emulsion, and/or a colored latex may be used as the pigment. Further, a pigment developed for the invention may be used.

Specific examples of the black pigment used in the invention include, but are not limited to, Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, and Raven 1060 (available from Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (available from Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (available from Degussa AG), and No. 25, No. 33, No. 40, No. 47, No. 52, No. 900, No. 2300, MCF-88, MA 600, MA 7, MA 8, and MA 100 (available from Mitsubishi Chemical Corporation).

Specific examples of the cyan pigment include, but are not limited to, C.I. Pigment Blue-1, -2, -3, -15, -15:1, -15:2, -15:3, -15:4, -16, -22, and -60.

Specific examples of the magenta pigment include, but are not limited to, C.I. Pigment Red-5, -7, -12, -48, -48:1, -57, -112, -122, -123, -146, -168, -184, and -202.

Specific examples of the yellow pigment include, but are not limited to, C.I. Pigment Yellow-1, -2, -3, -12, -13, -14, -16, -17, -73, -74, -75, -83, -93, -95, -97, -98, -114, -128, -129, -138, -151, -154, and -180.

The water-self-dispersible pigment used in the invention has many highly water-soluble groups on the surface thereof and can be stably dispersed in water without a high-molecular dispersing agent. Specifically, the water-self-dispersible pigment may be obtained by subjecting an ordinary pigment to surface modification such as acid/base treatment, coupling agent treatment, polymer grafting treatment, plasma treatment, and/or oxidation/reduction treatment.

Further, not only the above surface-modified pigment, but also a commercially available self-dispersible pigment such as Cab-o-jet-200, Cab-o-jet-250, Cab-o-jet-260, Cab-o-jet-270, Cab-o-jet-300, IJX-444, and/or IJX-55 available from Cabot Corporation and Microjet Black CW-1 and/or CW-2 available from Orient Chemical Industries, Ltd. may be used as the water-self-dispersible pigment.

The self-dispersible pigment which is used as a coloring agent of the ink preferably has a carboxylate group on the surface thereof. It is assumed that a carboxylate group has a low degree of dissociation and that a pigment including a carboxylate group threfore has sufficient cohesion.

When a coloring agent of the ink has a sulfonate group on the surface thereof, a high-molecular compound having a carboxylate group is preferably used in combination with such a coloring agent. It is difficult for the coloring agent having a sulfonate group to aggregate. Therefore, when such a coloring agent is used, optical density may not be improved, and bleeding and intercolor bleeding may not be suppressed. When such a coloring agent is used in combination with the high-molecular compound having a carboxylate group, the high-molecular compound having a carboxylate group becomes insoluble at the time that the ink and the liquid composition are mixed. At this time, the coloring agent particles are surrounded by the high-molecular compound and aggregate, whereby optical density is improved, and bleeding and intercolor bleeding are suppressed.

The pigment coated with a resin may be used as the coloring agent of the ink. This pigment is referred to as a microencapsulated pigment, and may be a commercial microencapsulated pigment available from Dainippon Ink and Chemicals, Inc., or Toyo Ink Manufacturing Co., Ltd., or a microencapsulated pigment developed for the invention.

Further, the pigment which is used as the coloring agent of the ink may be the polymer-grafted pigment. The polymer-grafted pigment is a pigment in which an organic compound such as a polymer chemically bonds to the surface of a pigment.

The dye for use in the invention may be a water-soluble dye or a dispersible dye.

Specific examples of the water-soluble dye include C.I. Direct Black-2, -4, -9, -11, -17, -19, -22, -32, -80, -151, -154, -168, -171, -194, and -195, C.I. Direct Blue-1, -2, -6, -8, -22, -34, -70, -71, -76, -78, -86, -112, -142, -165, -199, -200, -201, -202, -203, -207, -218, -236, -287, and -307, C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227, C.I. Direct Yellow-1, -2, -4, -8, -11, -12, -26, -27, -28, -33, -34, -41, 44, 48, -58, -86, -87, -88, -132, -135, -142, -144, and -173, C.I. Food Black-1 and -2, C.I. Acid Black-1, -2, -7, -16, -24, -26, -28, -31, -48, -52, -63, -107, -112, -118, -119, -121, -156, -172, -194, and -208, C.I. Acid Blue-1, -7, -9, -15, -22, -23, -27, -29, -40, -43, -55, -59, -62, -78, -80, -81, -83, -90, -102, -104, -111, -185, -249, and -254, C.I. Acid Red-1, -4, -8, -13, -14, -15, -18, -21, -26, -35, -37, -52, -110, -144, -180, -249, -257, and -289, and C.I. Acid Yellow-1, -3, -4, -7, -11, -12, -13, -14, -18, -19, -23, -25, -34, -38, 41, 42, 44, -53, -55, -61, -71, -76, -78, -79, and -122.

Specific examples of the dispersible dye include C.I. Disperse Yellow-3, -5, -7, -8, -42, -54, -64, -79, -82, -83, -93, -100, -119, -122, -126, -160, -184:1, -186, -198, -204, and -224, C.I. Disperse Orange-13, -29, -31:1, -33, -49, -54, -66, -73, -119, and -163, C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, and -362, C.I. Disperse Violet-33, C.I. Disperse Blue-14, -26, -56, -60, -73, -87, -128, -143, -154, -165, -165:1, -176, -183, -185, -201, -214, -224, -257, -287, -354, -365, and -368, and C.I. Disperse Green-6:1 and -9.

The coloring agent particles in the ink preferably have a volume average diameter of about 30 to about 250 nm. The volume average diameter means that of the coloring agent particles themself. Alternatively, when an additive such as a dispersing agent bonds to the coloring agent, the volume average diameter means that of particles including the coloring agent and the additive. In the invention, the volume average diameter is measured by Microtrac UPA particle size analyzer (Leeds & Northrup Company). Specifically, the volume average diameter is measured according to a predetermined method in which a measurement cell containing 4 ml of an ink is used. As parameters to be input to the measuring device for measurement, the viscosity of the ink and the density of the coloring agent are input as viscosity, and density of dispersed particles.

The volume average diameter is more preferably about 50 to about 200 nm, and stil more preferably about 75 to about 175 nm. When the volume average diameter of the coloring agent particles in the ink is less than 30 nm, optical density may lower. On the other hand, when the volume average diameter is more than 250 nm, storage stability of the ink may deteriorate.

The mass ratio of the coloring agent to the total mass of the ink is preferably about 0.1 to about 20% by mass, and more preferably about 1 to about 10% by mass. When the mass ratio is less than 0.1% by mass, optical density may be insufficient. On the other hand, the mass ratio is more than 20% by mass, the ink may be unstably ejected.

2-2. High-Molecular Substance

The ink preferably includes a high-molecular substance to disperse the coloring agent therein or to accelerate coagulation of the coloring agent. In the invention, the high-molecular substance used to disperse the coloring agent (pigment) is referred to as a high-molecular dispersing agent.

The high-molecular substance may be a water-soluble high-molecular substance or a water-insoluble high-molecular substance such as an emulsion and self-dispersible fine particles, and may be a nonionic compound, an anionic compound, a cationic compound, or an amphoteric compound.

The high-molecular substance in the ink is thickened or coagulated by the coagulating agent in the liquid composition. It is presumed that the reason why the high-molecular substance accelerates the coagulation speed of the coloring agent be that the coloring agent is incorporated into the high-molecular substance during the coagulation. Accordingly, the size and density of a structure at the time that the high-molecular substance is coagulated, and the degree of easiness at which the coloring agent is incorporated in the high-molecular substance are factors important for accelerating the coagulation speed of the coloring agent. Optical density can be improved, and bleeding and intercolor bleeding can be suppressed by selecting the types of the coloring agent and the high-molecular substance contained in the ink, and the type of the coagulating agent of the liquid composition such that the above-described factors are optimised.

The high-molecular substance is preferably a compound having a carboxylate group in the invention. It is presumed that the reason for this be as follows. The carboxylate group has a low degree of dissociation and may accelerate coagulation caused by the coagulating agent.

Specific examples of the high-molecular substance usable in the invention will be described below.

Specific examples of the high-molecular substance include copolymers of monomers having an α,β-ethylenic unsaturated group. Examples of the monomers having an α,β-ethylenic unsaturated group include acrylic acid, methacrylic acid, crotonic acid, itaconic acid, itaconic acid monoesters, maleic acid, maleic acid monoesters, fumaric acid, fumaric acid monoesters, vinylsulfonic acid, styrene sulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate, styrene, styrene derivatives such as α-methylstyrene and vinyltoluene, vinylcyclohexane, vinylnaphthalene, vinylnaphthalene derivatives, alkyl acrylates, phenyl acrylate, alkyl methacrylates, phenyl methacrylate, cycloalkyl methacrylates, alkyl crotonates, dialkyl itaconates, and dialkyl maleates.

The copolymer produced by copolymerizing one or more monomers having an α,β-ethylenic unsaturated group can be preferably used as the high-molecular substance in the invention. Specific examples of such a copolymer include styrene-styrenesulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, alkyl acrylate-acrylic acid copolymers, alkyl methacrylate-methacrylic acid copolymers, styrene-alkyl methacrylate-methacrylic acid terpolymers, styrene-alkyl acrylate-acrylic acid terpolymers, styrene-phenyl methacrylate-methacrylic acid terpolymers, and styrene-cyclohexyl methacrylate-methacrylic acid terpolymers.

The high-molecular substance is preferably selected on the basis of the acid value in consideration of affinity between the high-molecular substance and the coloring agent (pigment), and/or the coagulation property of the high-molecular substance itself. Specifically, the high-molecular substance preferably has an acid value of at least 30 KOH mg/g and less than 150 KOH mg/g, or an acid value of 150 KOH mg/g or more and a neutralization degree of 80% or less.

When the high-molecular substance has an acid value of at least 30 KOH mg/g and less than 150 KOH mg/g, the acid value is more preferably about 50 to about 120 KOH mg/g, and still more preferably about 70 to about 120 KOH mg/g. When the acid value is less than 30 KOH mg/g, ejecting stability of the ink may deteriorate.

When the high-molecular substance has an acid value of 150 KOH mg/g or more and a neutralization degree of 80% or less, the high-molecular substance more preferably has an acid value of about 200 to about 400 KOH mg/g and a neutralization degree of about 50 to about 80%, and still more preferably has an acid value of about 200 to about 300 KOH mg/g and a neutralization degree of about 60 to about 80%. When the acid value is more than 400 KOH mg/g and the neutralization degree is more than 80%, the ink has a high viscosity and cannot be normally ejected out in some cases.

The advantages of use of a high-molecular substance having a low acid value, or a high acid value and a low neutralization degree is thought to be as follows. The number of water-soluble groups of the high-molecular substance can be reduced, and, even when a coagulating agent having weak cohesion is contained in the liquid composition, sufficient cohesion can be achieved.

The weight-average molecular weight of the high-molecular substance is preferably about 2,000 to about 15,000, and more preferably about 3,500 to about 10,000. When the weight-average molecular weight of the high-nolecular substance is less than 2,000, the pigment may be unstably dispersed in the ink. On the other hand, when the weight-average molecular weight is more than 15,000, the viscosity of the ink becomes high and ejecting property of the ink deteriorates in some cases.

The mass ratio of the high-molecular substance to the total mass of the ink is preferably about 0.01 to about 10% by mass, more preferably about 0.05 to about 7.5% by mass, and still more preferably about 0.1 to about 5% by mass. When the mass ratio is more than 10% by mass, the viscosity of the ink becomes high and ejecting property of the ink deteriorates in some cases. On the other hand, when the mass ratio is less than 0.01% by mass, dispersion stability of the pigment may lower.

2-3. Water-Soluble Solvent

The water-soluble solvent for use in the ink may be any solvent as long as it has a solubility of about 0.1% or more in water. Specifically, the water-soluble solvent may be a polyhydric alcohol, a polyhydric alcohol derivative, a nitrogen-containing solvent, an alcohol, and/or a sulfur-containing solvent.

Specific examples of the polyhydric alcohol include ethylene glycol, diethylene glycol, propylene glycol, butylene glycol, triethylene glycol, 1,5-pentanediol, 1,2,6-hexanetriol, and glycerin.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an adduct of diglycerin and ethylene oxide.

Specific examples of the nitrogen-containing solvent include pyrrolidone, N-methyl-2-pyrrolidone, cyclohexylpyrrolidone, and triethanolamine.

Specific examples of the alcohol include ethanol, isopropyl alcohol, butyl alcohol, and benzyl alcohol.

Specific examples of the sulfur-containing solvent include thiodiethanol, thiodiglycerol, sulfolane, and dimethyl sulfoxide.

Further, the water-soluble solvent may be propylene carbonate, and/or ethylene carbonate.

One of these water-soluble solvents may be used, or two or more of them may be used together.

The mass ratio of the water-soluble solvent to the total mass of the ink is preferably about 1 to about 60% by mass, and more preferably about 5 to about 40% by mass. When the mass ratio is less than 1% by mass, sufficient optical density may not be obtained. On the other hand, the mass ratio is more than 60% by mass, the viscosity of the ink becomes high and ejecting stability thereof deteriorates in some cases.

2-4. Preferred Physical Properties of Ink

The surface tension of the ink is preferably about 20 to about 60 mN/m, more preferably about 20 to about 45 mN/m, and still more preferably about 20 to about 39 mN/m. When the surface tension is less than 20 mN/m, the ink leaks from a nozzle and spreads on a head nozzle surface and ejecting property of the ink deteriorates in some cases. On the other hand, when the surface tension is more than 60 mN/m, permeation of the ink into paper may require longer time, and drying time may lengthen.

Further, the viscosity of the ink is preferably about 1.2 to about 15 mPa·s, more preferably not less than about 1.5 mPa·s and less than about 10 mPa·s, and still more preferably not less than about 1.8 mPa·s and less than about 8 mPa·s. When the viscosity of the ink is higher than 15 mPa·s, ejecting property of the ink may deteriorate. On the other hand, the viscosity is lower than 1.2 mPa·s, ejecting stability of the ink may deteriorate at the time of continuous ejecting.

2-5. Water

The ink contains water such that the surface tension and the viscosity are within the above ranges. The mass ratio of water to the total mass of the ink is not particularly limited, but is preferably about 10 to about 99% by mass, and more preferably about 30 to about 80% by mass.

3. Liquid Composition

Next, the details of the liquid composition used in the ink jet recording method of the invention will be described.

The liquid composition used in the invention contains at least a coagulating agent. The components of the liquid composition will be described in detail below.

3-1. Coagulating Agent

The coagulating agent used in the invention is a substance that reacts or interacts with a component or components of the ink to thicken or coagulate the ink. The substance may be a polyvalent metal ion or a cationic substance. Specifically, an inorganic electrolyte, an organic amine compound, and/or an organic acid is effetive as such a substance.

The inorganic electrolyte may be a salt of a metal ion and an acid. Examples of the metal ion include alkaline metal ions such as a lithium ion, a sodium ion, and a potassium ion; and polyvalent metal ions such as an aluminum ion, a barium ion, a calcium ion, a copper ion, an iron ion, a magnesium ion, a manganese ion, a nickel ion, a tin ion, a titanium ion, and a zinc ion. Examples of the acid include hydrochloric acid, hydrobromic acid, hydroiodic acid, sulfuric acid, nitric acid, phosphoric acid, thiocyanic acid, organic carboxylic acids such as acetic acid, oxalic acid, lactic acid, fumaric acid, citric acid, salicylic acid, and benzoic acid, and organic sulfonic acids.

Specific examples of the inorganic electrolyte include alkaline metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and polyvalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

The organic amine compound may be a primary, secondary, tertiary, or quaternary amine, or a salt thereof.

Specific examples of the organic amine compound include tetraalkylammonium salts, alkylamine salts, benzalconium salts, alkylpyridium salts, imidazolium salts, and polyamine salts, such as isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethylstearylamine, 2-heptadecenyl-hydroxyethylimidazoline, lauryl dimethyl benzyl ammonium chloride, cetylpyridinium chloride, stearamidemethylpyridium chloride, diallyl dimethyl ammonium chloride polymers, diallylamine polymers, monoallylamine polymers, onium salts thereof including sulfonium salts and phosphonium salts thereof, and phosphate esters thereof.

The organic acid is preferably a compound represented by the following Formula (1).

Formula (1)

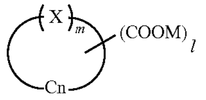

In the formula, X represents O, CO, NH, NR, S, or $SO_2$. R represents an alkyl group and is preferably $CH_3$, $C_2H_5$, or $C_2H_4OH$. X is preferably CO, NH, NR, or O, and more preferably CO, NH, or O. M represents a hydrogen atom, an alkaline metal, or an amine moiety. M is preferably H, Li, Na, K, monoethanolamine, diethanolamine, or triethanolamine, more preferably H, Na, or K, and still more preferably a hydrogen atom. "n" represents an integer from 3 to 7. n is preferably such that the ring is a 6- or 5-membered ring, and is more preferably such that the ring is a 5-membered ring. "m" represents 1 or 2. When the compound represented by Formula (1) is a heterocyclic compound, the heterocycle may be a saturated or unsaturated ring. "l" represents an integer from 1 to 5.

Specifically, the compound represented by formula (1) may be a compound having a structure of furan, pyrrole, pyrroline, pyrrolidone, pyrone, pyrrole, thiophene, indole, pyridine, or quinoline, and a functional group of a carboxyl group. Specific examples of such a compound include 2-pyrrolidone-5-carboxylic acid, 4-methyl-4-pentanolide-3-carboxylic acid, furancarboxylic acid, 2-benzofurancarboxylic acid, 5-methyl-2-furancarboxylic acid, 2,5-dimethyl-3-furancarboxylic acid, 2,5-furandicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophenecarboxylic acid, 2-pyrrolecarboxylic acid, 2,3-dimethylpyrrole-4-carboxylic acid, 2,4,5-trimethylpyrrole-3-propionic acid, 3-hydroxy-2-indolecarboxylic acid, 2,5-dioxo-4-methyl-3-pyrroline-3-propionic acid, 2-pyrrolidinecarboxylic acid, 4-hydroxyproline, 1-methylpyrrolidine-2-carboxylic acid, 5-carboxy-1-methylpyrrolidine-2-acetic acid, 2-pyridinecarboxylic acid, 3-pyridinecarboxylic acid, 4-pyridinecarboxylic acid, pyridinedicarboxylic acid, pyridinetricarboxylic acid, pyridinepentacarboxylic acid, 1,2,5,6-tetrahydro-1-methylnicotinic acid, 2-quinolinecarboxylic acid, 4-quinolinecarboxylic acid, 2-phenyl-4-quinolinecarboxylic acid, 4-hydroxy-2-quinolinecarboxylic acid, and 6-methoxy-4-quinolinecarboxylic acid, and derivatives and salts thereof.

The compound represented by Formula (1) is more preferably pyrrolidonecarboxylic acid, pyronecarboxylic acid, pyrrolecarboxylic acid, furancarboxylic acid, pyridinecarboxylic acid, coumaric acid, thiophenecarboxylic acid, and/or nicotinic acid, and/or a derivative and/or a salt thereof. The compound is still more preferably pyrrolidonecarboxylic acid, pyronecarboxylic acid, furancarboxylic acid, and/or coumaric acid, and/or a derivative and/or a salt thereof.

Magnesium chloride, magnesium bromide, magnesium iodide, magnesium sulfate, magnesium nitrate, magnesium acetate, calcium chloride, calcium bromide, calcium nitrate, calcium dihydrogen phosphate, calcium benzoate, calcium acetate, calcium tartrate, calcium lactate, calcium fumarate, calcium citrate, diallyl dimethyl ammonium chloride polymers, diallylamine polymers, monoallylamine polymers, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, potassium dihydrogen citrate, succinic acid, tartaric acid, lactic acid, and potassium hydrogen phthalate, and derivatives and salts thereof are preferred among these coagulating agents. Magnesium chloride, magnesium nitrate, calcium nitrate, diallylamine polymers, pyrrolidonecarboxylic acid, pyronecarboxylic acid, furancarboxylic acid, and coumaric acid, and derivatives and salts thereof are more preferred.

In the invention, one coagulating agent may be used, or two or more coagulating agents may be used together.

The mass ratio of the coagulating agent(s) to the total mass of the liquid composition is preferably about 0.01 to about 30% by mass, more preferably about 0.1 to about 15% by mass, and still more preferably about 0.25 to about 10% by mass. When the mass is less than 0.01% by mass, coagulation caused by the coagulating agent may become insufficient at the time that the ink is in contact with the liquid composition, thereby deteriorating optical density, bleeding, and intercolor bleeding. On the other hand, when the mass ratio is more than 30% by mass, ejecting property of the liquid composition may deteriorate and the liquid composition cannot be normally ejected out in some cases.

3-2. Water-Soluble Solvent

The liquid composition may contain a water-soluble solvent, which may be the same as that of the ink.

The mass ratio of the water-soluble solvent to the total mass of the liquid composition is preferably about 1 to about 060% by mass, and more preferably about 5 to about 40% by mass. When the mass is less than 1% by mass, sufficient optical density may not be obtained. On the other hand, when the mass ratio is more than 60% by mass, the viscosity of the liquid composition becomes high and ejecting property of the liquid composition may deteriorate.

3-3. Preferred Physical Properties of Liquid Composition

The surface tension of the liquid composition is preferably about 10 to about 45 mN/m, more preferably about 15 to about 39 mN/m, and still more preferably about 15 to about 35 mN/m. When the surface tension is less than 10 mN/m, the liquid composition leaks from a nozzle and spreads on a head nozzle surface and ejecting property of the ink deteriorates in some cases. On the other hand, when the surface tension is more than 45 mN/m, penetration of the ink into paper may deteriorate, and drying time may lengthen.

The surface tension of the liquid composition is preferably smaller than that of the ink. Feathering is further improved when the spreading rate of the liquid composition on a recording medium is higher than that of the ink.

The viscosity of the liquid composition is preferably about 1.2 to about 15 mPa·s, more preferably at least 1.5 mPa·s and less than 10 mPa·s, and still more preferably at least 1.8 mPa·s and less than 8 mPa·s. When the viscosity of the liquid composition is higher than 15 mPa·s, ejecting property of the liquid composition may deteriorate. On the other hand, when the viscosity is less than 1.2 mPa·s, ejecting stability of the liquid composition may deteriorate at the time of continuous ejecting.

When the droplet amount of the liquid composition is equal to that of the ink, the viscosities and the surface tensions of the ink and the liquid composition are preferably controlled such that the size of spread dots of the liquid composition is larger than that of the ink. When the size of spread dots of the liquid composition is larger than that of the ink, feathering is further improved.

In the invention, the pH value of the liquid composition containing the compound represented by Formula (1) is preferably about 1.5 to about 12.0, more preferably about 2.0 to about 7.5, and still more preferably about 2.5 to about 6.0. When the pH value of the liquid composition is less than 1.5, the liquid composition undesirably dissolves the flow path portion of a print head, resulting in failure of the print head in some cases. On the other hand, when the pH value of the liquid composition is more than 12.0, the liquid composition may insufficiently coagulate the coloring agent at the time that the ink is in contact with the liquid composition, thereby deteriorating optical density, bleeding, and intercolor bleeding.

The number of coarse particles having a particle size of 5 μm or more is preferably 500 or more per μL of a mixed liquid of the ink and the liquid composition. The number is more preferably about 500 to about 10,000, and still more preferably about 500 to about 3,000 per μL of the mixed liquid. When the number of the coarse particles in the mixed liquid of the ink and the liquid composition is less than 500 per μL, optical density may lower.

In the invention, the number of the coarse particles having a size of 5 μm or more in the mixed liquid of the ink and the liquid composition is obtained by mixing the ink and the liquid composition at a mass ratio of 1:1, taking out 2 μL of a sample from the resultant mixed liquid, which is being stirred, and setting the sample in ACCUSIZER TM770 OPTICAL PARTICLE SIZER manufactured by Particle Sizing Systems Inc. As for parameters to be input to the device for measurement, the density of the coloring agent is input as a density of dispersed particles. The density of the coloring agent can be obtained by heating and drying a coloring agent dispersion, and measuring the density of the resultant coloring agent powder with a density meter or a density bottle.

3-4. Water

The liquid composition may contain water such that the surface tension and the viscosity are within the above ranges. The mass ratio of water to the total mass of the liquid composition is not particularly limited, but is preferably about 10 to about 99% by mass, and more preferably about 30 to about 80% by mass.

3-5. Coloring Agent

The liquid composition may contain a coloring agent, if necessary. The coloring agent in the liquid composition may be selected from those described in the explanations for the coloring agent of the ink. The coloring agent of the liquid composition is preferably a dye, a pigment having a sulfonic acid group or a sulfonate group on the surface thereof, an anionic self-dispersible pigment, and/or a cationic self-dispersible pigment. The reason for this is that they be hard to coagulate under an acidic condition and can improve storage stability of the liquid composition.

4. Other Additives

Additives which can be contained in the ink and/or the liquid composition will be described below.

A surfactant may be contained in the ink and/or the liquid composition. A compound having a hydrophilic moiety and a hydrophobic moiety within the molecule thereof can be effectively used as the surfactant in the invention. The surfactant may be an anionic surfactant, a cationic surfactant, an ampholytic surfactant, and/or a nonionic surfactant. Further, the above-described high-molecular substance (the high-molecular dispersing agent) may be used as the surfactant.

Examples of the anionic surfactant include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkylsulfosuccinates, higher alkylphosphates, and phosphates of adducts of higher alcohol and ethylene oxide. Specific examples of effective anionic surfactants include dodecylbenzene sulfonate, kerylbenzene sulfonate, isopropylnaphthalene sulfonate, monobutylphenylphenol monosulfonate, monobutylbiphenyl sulfonate, and dibutylphenylphenol disulfonate.

Specific examples of the nonionic surfactant include polypropylene glycol-ethylene oxide adducts, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, acetylene glycol-oxyethylene adducts, aliphatic alkanolamides, glycerin esters, and sorbitan esters.

Examples of the cationic surfactant include tetraalkylammonium salts, alkylamine salts, benzalconium salts, alkylpyridium salts, and imidazolium salts. Specific examples thereof include dihydroxyethylstearylamine, 2-heptadecenyl-hydroxyethylimidazoline, lauryl dimethyl benzyl ammonium chloride, cetylpyridinium chloride, and stearamidemethylpyridium chloride.

Further, spiclisporic acid, and/or biosurfactants such as rhamnolipid and lysolecithin may also be used as the surfactant in the invention.

The content of the surfactant in each of the ink and the liquid composition is preferably less than 10% by mass, more preferably about 0.01 to about 5% by mass, and still more preferably about 0.01 to about 3% by mass. When the surfactant content is 10% by mass or more, optical density and storage stability of a pigment ink may deteriorate.

Further, to improve properties of the ink and/or the liquid composition, such as ejecting property, the ink and/or the liquid composition may contain polyethyleneimine, polyamine, polyvinylpyrrolidone, polyethylene glycol, a cellulose derivative such as ethylcellulose and/or carboxymethylcellulose, a polysaccharide and/or a derivative thereof, a water-soluble polymer, a polymer emulsion such as an acrylic polymer emulsion, a polyurethane emulsion, and/or a hydrophilic latex, a hydrophilic polymer gel, a cyclodextrin, a macrocyclic amine, a dendrimer, a crown ether, urea or a derivative thereof, acetamide, a silicone surfactant, and/or a fluorinated surfactant.

Further, the ink and/or the liquid composition may contain an alkaline metal compound such as potassium hydroxide, sodium hydroxide, and/or lithium hydroxide, a nitrogen-containing compound such as ammonium hydroxide, triethanolamine, diethanolamine, ethanolamine, and/or 2-amino-2-methyl-1-propanol, an alkaline earth metal compound such as calcium hydroxide, an acid such as sulfuric acid, hydrochloric acid, and/or nitric acid, and/or a salt of a strong acid and a weak alkali such as ammonium sulfate so as to control conductivities and pH values thereof.

Furthermore, the ink and/or the liquid composition may also contain a pH buffer, an antioxidant, a fungicide, a viscosity-controlling agent, an electrically conducting agent, and/or an ultraviolet absorbent, if necessary.

The ink and the liquid composition used in the invention can be used in not only an ordinary ink jet recording apparatus, but also a recording apparatus equipped with a heater for controlling drying property of an ink, or a recording apparatus equipped with an intermediate transfer unit for transferring a recording material printed on an intermediate member onto a recording medium such as paper. Further, the liquid composition can be applied by a unit other than ink jet systems, such as a liquid application roller.

5. Ink Jet Recording Apparatus

The ink jet recording apparatus according to a first embodiment of the invention has a recording head for ejecting an ink containing a coloring agent and a colorless or unicolor liquid composition containing a component for coagulating and/or thickening the ink onto a recording medium, and a unit for controlling the application positions of droplets of the ink and the liquid composition such that the ink and the liquid composition are not in contact with each other on the recording medium immediately after ejecting and come into contact with each other when a certain period of time has lapsed since the ejecting.

As described in the explanations for the ink jet recording method of the invention, the application positions may be controlled by (a) controlling the amount of a droplet of the ink, or that of the liquid composition, or the amounts of droplets of the two, (b) controlling the application positions of droplets of the ink, the liquid composition, or the two, or (c) combinations of the above-described measures a) and b). Preferred embodiments of controlling the application positions and the application amounts are shown in FIGS. 4 to 8.

As described above, it is preferable that the ink and the liquid composition are ejected while changing the weight of one droplet of the ink and/or that of the liquid composition. The weight may be changed by a ejecting heater. However, the weight is preferably changed by a method of controlling a driving voltage to be applied to the head, because such a method has a high degree of freedom in changing the amounts of droplets.

Preferred embodiments of the ink jet recording apparatus of the invention (hereinafter referred to as a recording apparatus simply in some cases) will be described in detail below with reference to drawings, which are not intended to restrict the invention.

Figure 12:
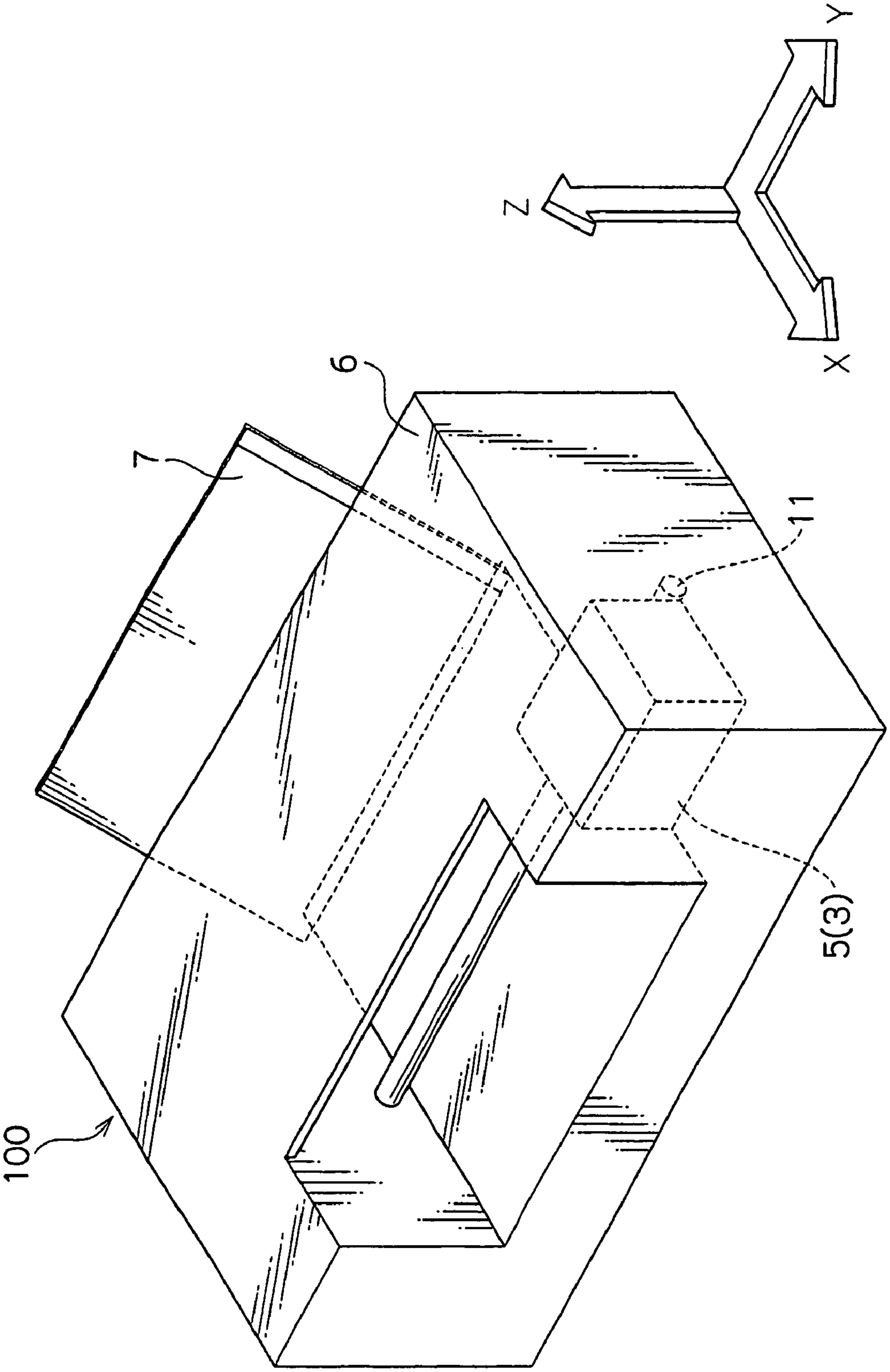
FIG. 12 is a perspective view showing appearance of an ink jet recording apparatus according to a preferred embodiment of the invention.
Figure 13:
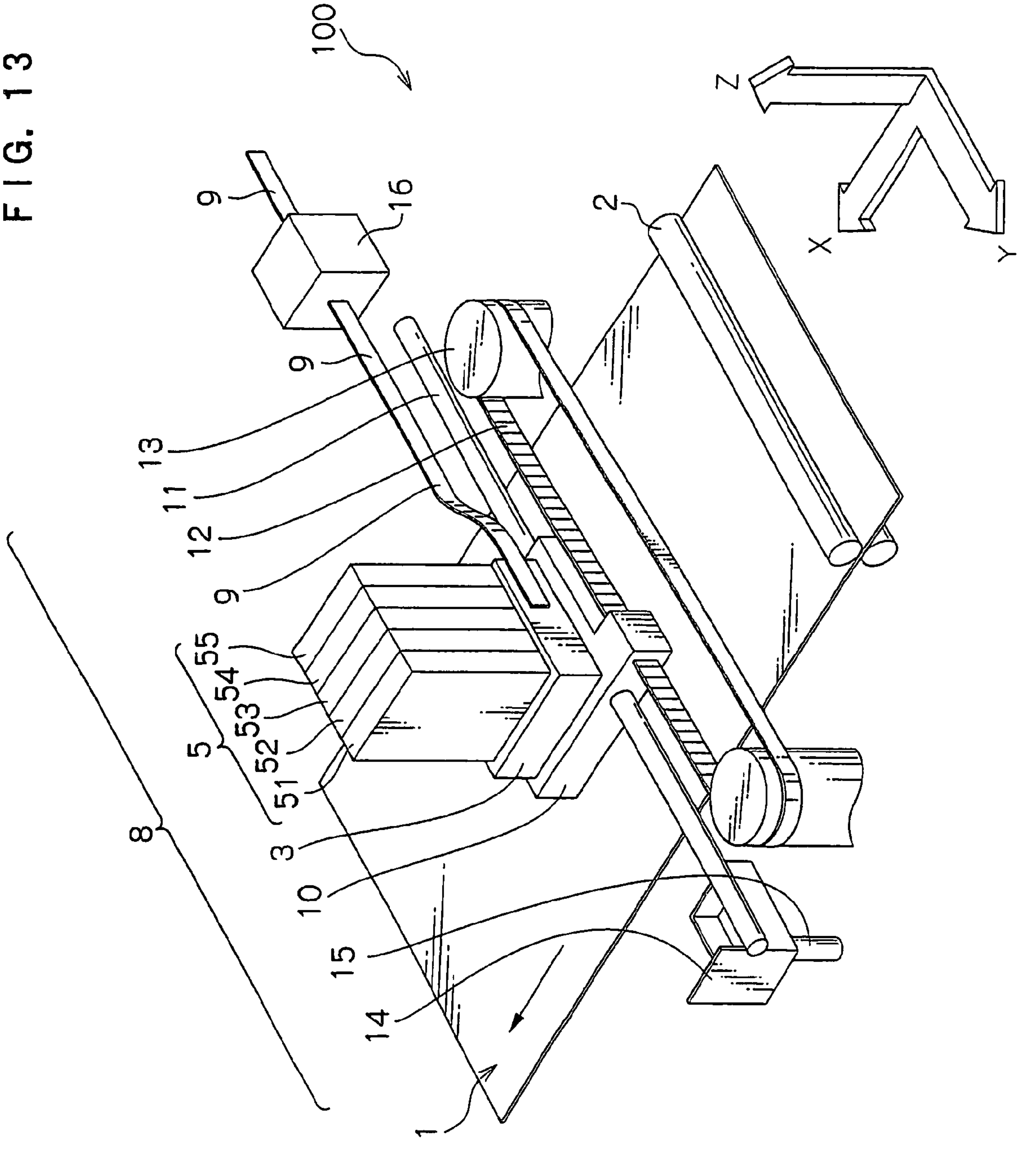
FIG. 13 is a perspective view showing the basic internal structure of the ink jet recording apparatus of FIG. 12.

FIG. 12 is a perspective view showing the appearance of an ink jet recording apparatus according to a preferred embodiment of the invention. FIG. 13 is a perspective view showing the basic internal structure of the ink jet recording apparatus of FIG. 12.

The recording apparatus 100 of this embodiment is driven and forms (or prints) an image according to the ink jet recording method of the invention.

As shown in FIGS. 12 and 13, the recording apparatus 100 has, as main components thereof, an external cover 6, a tray 7 on which a certain number of recording media 1 such as plain paper can be placed, feeding rollers (feed unit) 2 for feeding the recording media 1 into the inside of the recording apparatus 100 one by one, and an image forming unit 8 for ejecting the ink and the liquid composition onto a recording medium 1 to form an image.

The feeding rollers 2 are a pair of rollers rotatably disposed in the recording apparatus 100. The feeding rollers 2 sandwich a recording medium 1 placed on the tray 7, and feed the recording medium 1 into the inside of the recording apparatus 100 one by one at a predetermined timing.

The image forming unit 8 ejects the ink and the liquid composition onto the recording medium 1 to form an image. The image forming unit 8 mainly has a recording head 3, an ink tank 5, an electrical signal feeding cable 9, a carriage 10, a guide rod 11, a timing belt 12, driving pulleys 13, and a maintenance unit 14.

In this embodiment, the ink tank 5 has plural tanks 51 to 55, in which inks of different colors and the liquid composition are stored ejectably.

Further, as shown in FIG. 13, the recording head 3 is electrically connected to the electrical signal feeding cable 9 and communicates with the ink tank 5. When printing information (image recording information) is input from the outside to the recording head 3 through the electrical signal feeding cable 9, the recording head 3 sucks predetermined amounts of the inks from the ink tanks 51 to 55 on the basis of the information, and ejects the inks onto a recording medium. The electrical signal feeding cable 9 supplies not only the printing information, but also electric power for driving to the recording head 3.

The recording head 3 is disposed and fixed on the carriage 10, and the carriage 10 is connected to the guide rod 11 and the timing belt 12 wound around the driving pulleys 13. Thus, the recording head 3 can be moved parallel to the recording medium 1 along the guide rod 11 in the direction Y (main scanning direction) perpendicular to the recording medium feeding direction X (sub scanning direction).

The recording apparatus 100 is equipped with a control device (not shown) for controlling driving timing of the recording head 3 and that of the carriage 10 on the basis of the image recording information. Thereby, an image corresponding to the image recording information can be continuously formed on a predetermined region of a recording medium 1 fed in the feeding direction X at a predetermined speed.

The control device for controlling the driving timings has a unit (1) for controlling the discharge positions of the liquid composition and the ink and a unit (2) for controlling the amounts of droplets of the liquid composition and the ink. Further, the unit (2) preferably has a unit (2-1) for changing the amounts of droplets of the ink and/or the liquid composition in a position in which an ink image area is the nearest to a liquid composition-ejecting area, and/or a unit (2-2) for changing the amounts of droplets of the ink and/or the liquid composition in a boundary portion of the image area. The amounts of the droplets are preferably changed by controlling the input waveform of a driving voltage to be applied to the head.

In the ink jet recording apparatus implementing the ink jet recording method of the invention, given $D_{ink}$ represents the weight of a droplet of the ink and $D_{liq}$ represents the weight of a droplet of the liquid composition, $D_{ink}$ and $D_{liq}$ are preferably controlled to satisfy the following expression (1). Further, given $W_{ink}$ represents the weight of the ink applied per unit area and $W_{liq}$ represents the weight of the liquid composition applied per unit area, $W_{ink}$ and $W_{liq}$ are preferably controlled to satisfy the following expression (2).

$$0.15<D_{liq}/D_{ink}<1.0 \quad \text{Expression (1)}$$

$$0.15<W_{liq}/W_{ink}<1.0 \quad \text{Expression (2)}$$

When both the expressions (1) and (2) are satisfied, feathering is further improved, and further unevenness in solid printing portions is improved. It is preferable that the expressions (1) and (2) are satisfied in both the boundary portions and the non-boundary portions.

It is preferable that the liquid composition is applied to the non-boundary portion of the image area. This is because feathering and drying speed of the ink are improved and further image density is increased, as described above. When the liquid composition is jected onto the non-boundary portion of the image area in a single-sided printing mode, the mass ratio of the application amount of the ink per unit area to that of the liquid composition per unit area is preferably 100:5 to 100:100, more preferably 100:5 to 100:50, and still more preferably 100:10 to 100:20. When the mass ratio of the application amount of the liquid composition per unit area to that of the ink per unit area is less than 5/100, coagulation is insufficient, and optical density, bleeding, and intercolor bleeding deteriorate in some cases. On the other hand, when the mass ratio of the application amount of the liquid composition per unit area to that of the ink per unit area is more than 100/100, curling and cockling of the recording medium may deteriorate.

When the liquid composition is ejected onto the non-boundary portion of the image area in a double-sideed printing mode, the mass ratio of the application amount of the ink per unit area to that of the liquid composition per unit area is preferably 100:1 to 100:50, more preferably 100:1 to 100:25, and still more preferably 100:2 to 100:15. When the mass ratio of the application amount of the liquid composition per unit area to that of the ink per unit area is less than 1/100, coagulation is insufficient, and optical density, bleeding, and intercolor bleeding deteriorate in some cases. On the other hand, when the mass ratio of the application amount of the liquid composition per unit area to that of the ink per unit area is more than 25/100, an image with stains is obtained in high-speed, double-sided printing.

It is preferable that the amount of the ink applied to boundary portion is smaller than that applied to a non-boundary portion. This can suppress the ink undesirably extending beyond the liquid composition. In an image area, the amount of the ink applied to the boundary portion is preferably about 10 to about 95%, and more preferably about 20 to about 70% of that applied to a non-boundary portion.

In order to prevent feathering, it is preferable that, in the image area, the amount of the liquid composition applied to the boundary portion is smaller than that applied to the non-boundary portion. In the image area, the amount of the liquid composition applied to the boundary portion is preferably about 10 to about 95%, and more preferably about 20 to about 70% of that applied to the non-boundary portion.

In a non-image area, it is preferable that (1) the liquid composition is not applied to a boundary portion. Alternatively, (2) the liquid composition is preferably applied to the boundary portion of the non-image area such that the amount of the liquid composition applied to the boundary portion is smaller than that applied to the non-boundary portion of the non-image area. This is because feathering can be prevented. The amount of the liquid composition applied to the boundary portion is preferably about 0 to about 95%, and more preferably about 0 to about 70% of that applied to the non-boundary portion.

The application amount per unit area may be lowered by reducing the amount of each droplet or by reducing the number of droplets without decreasing the amount of each droplet. Both methods may be used for the ink and the liquid composition.

The number of dots of the liquid composition per unit area is preferably larger than that of the ink per unit area. When the expression (2) is satisfied in this case, the application amount of the liquid composition per unit area is smaller than that of the ink per unit area, and the number of dots of the liquid composition per unit area is larger than that of the ink per unit area. That is, it is preferable to eject a large number of small droplets of the liquid composition. The expression (2) is also satisfied by ejecting a reduced number of large droplets, but it is preferable to eject a large number of small droplets of the liquid composition as described above. This is because the liquid composition rapidly penetrates and diffuses in, and uniformly adheres to a recording medium to achieve good uniformity of image quality.

In the invention, the application amount of each of the ink and the liquid composition is preferably about 25 ng or less per pixel. The application amount of the ink per pixel is more preferably about 0.5 to about 20 ng, and still more preferably about 2 to about 8 ng. The application amount of the liquid composition per pixel is more preferably about 0.5 to about 15 ng, and still more preferably about 0.5 to about 4 ng. When the application amount of each of the ink and the liquid composition per pixel is more than 25 ng, bleeding occurs or drying time of the coloring agent lengthens in some cases. The reason of occurrence of bleeding is thought to be as follows. The contact angle of each of the ink and the liquid composition with respect to a recording medium depends on the amount of a droplet. Therefore, as the amount of a droplet increases, the droplet tends to more easily spread on paper.

In the invention, the term "(one) pixel" means a minimum of printing units obtained by resolving an image, and the size of the minimum printing unit mainly depends on the resolution of a print head and the resolution of a recording medium in a recording medium feeding direction. Therefore, a product of the application amount of an ink per pixel by the number of pixels per unit area is the total application amount of the ink necessary to form the unit area, and a product of the application amount of the liquid composition per pixel by the number of pixels per unit area is the total application amount of the liquid composition necessary to form the unit area.

The maintenance unit 14 is connected to a decompression device via a tube 15, and further connected to nozzles of the recording head 3. The internal pressure of each nozzle is reduced by a vacuum pump (not shown) disposed in a connection portion, whereby an ink is aspirated from each nozzle. The numeral 16 represents a unit for detecting the position of the head.

By using the maintenance unit 14, an obstructive ink adhered to the nozzles can be removed at the time that the recording apparatus 100 is being driven, and vaporization of the ink from the nozzles can be prevented at the time that the recording apparatus 100 is being stopped, if necessary. Since the coagulate is formed at the time that the ink and the liquid composition is mixed, the maintenance unit 14 preferably has a structure in which the ink and the liquid composition are separately stored to prevent such coagulate.

In the invention, the recording head 3 preferably implements a thermal ink jet recording method or a piezo ink jet recording method.

The recording head 3 can change the application amount (the droplet amount, and/or the number of dots) of the ink and/or that of the liquid composition per pixel. The recording head 3 is made of a material having resistance to the components of the ink and the liquid composition.

In the invention, the ink jet recording apparatus may be such that droplets having different volumes can be ejected out from one nozzle of the recording head 3.

The recording medium 1, onto which the ink and the liquid composition are ejected, may be plain paper, ink jet plain paper, coated paper, or film for ink jet printing. Coagulating property and permeability on a recording medium depend on the type of the recording medium, whereby it is preferable that the application amount of each of the ink and the liquid composition is appropriately selected according to the type of the recording medium.

Figure 14:
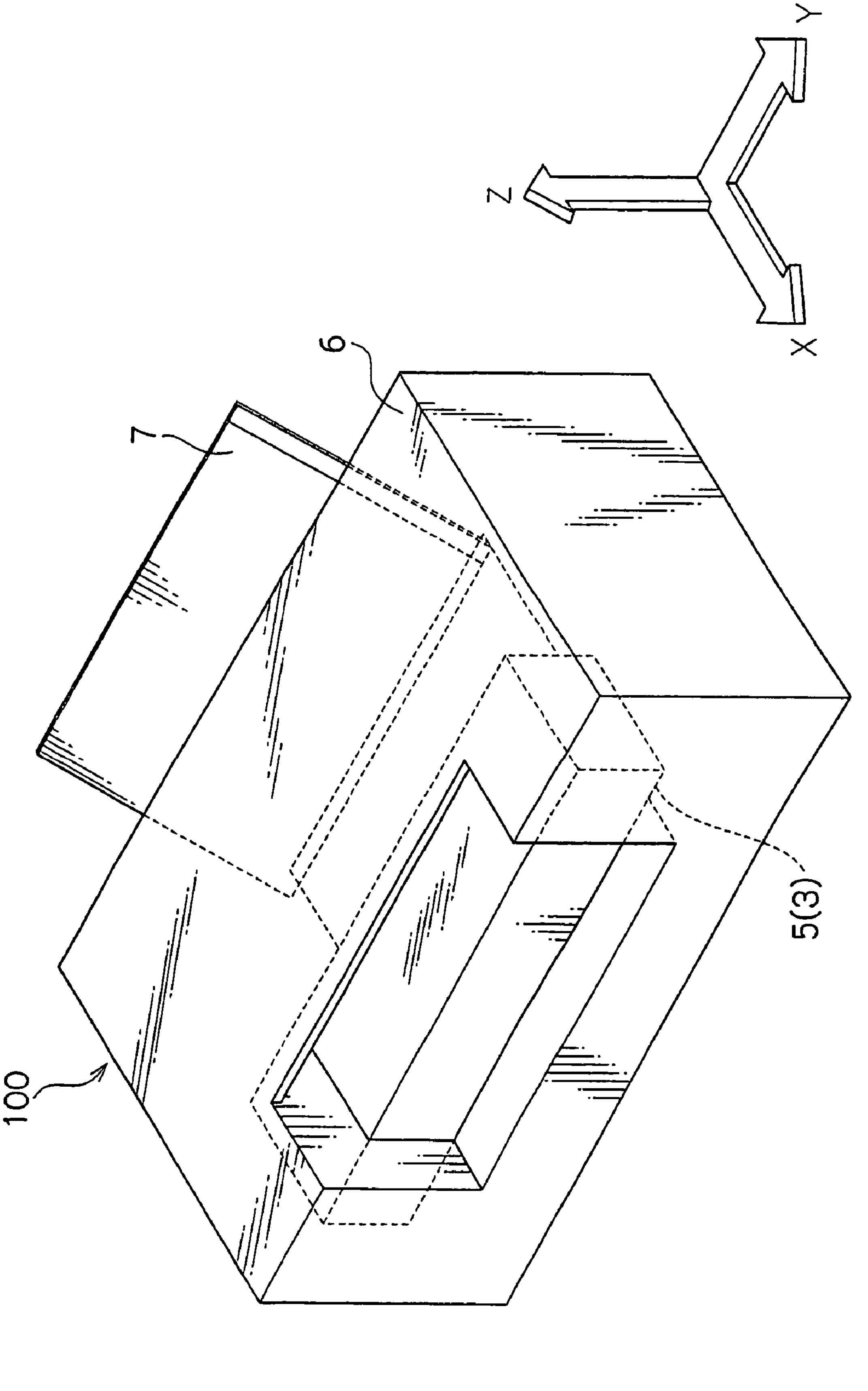
FIG. 14 is a perspective view showing appearance of an ink jet recording apparatus according to another preferred embodiment of the invention.
Figure 15:
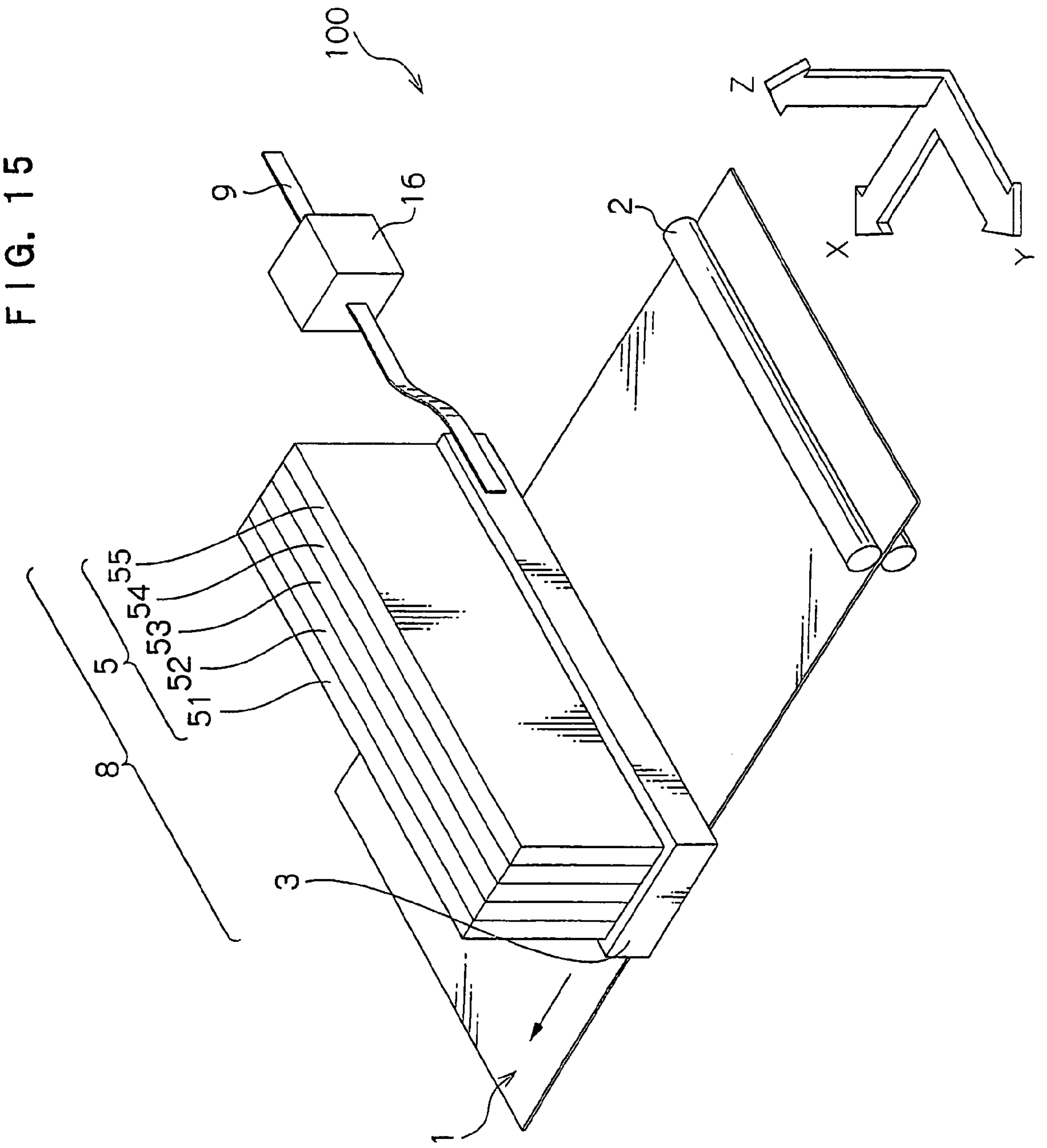
FIG. 15 is a perspective view showing the basic internal structure of the ink jet recording apparatus of FIG. 14.

FIG. 14 is a perspective view showing appearance of an ink jet recording apparatus according to another preferred embodiment of the invention. FIG. 15 is a perspective view showing the basic internal structure of the ink jet recording apparatus of FIG. 14 (hereinafter referred to as the image forming apparatus). The image forming apparatus 100 of this embodiment is driven according to the ink jet recording method of the invention to form an image.

The image forming apparatus 100 shown in FIGS. 14 and 15 has a recording head 3, and the width of the recording head 3 is equal to or larger than that of a recording medium 1. The apparatus does not have a carriage, and has a paper feeding unit for feeding the recording medium 1 in a sub scanning direction (the recording medium feeding direction indicated by an arrow X). Feeding rollers 2 are used as the paper feeding unit in this embodiment. However, the paper feeding unit may be a feeding belt. In the recording head 3, ink tanks 51 to 55 are arranged in the sub scanning direction, and nozzles (not shown) from which color inks and a processing liquid are ejected are also arranged in the sub scanning direction (the recording medium feeding direction indicated by the arrow X) and a main scanning drection. The other components of the apparatus are the same as those of the apparatus 100 shown in FIGS. 12 and 13, and explanations therefor are omitted.

In the image forming apparatus 100 shown in FIGS. 14 and 15, printing in the width direction of the recording medium 1 (main scanning direction) is achieved all at once by the recording head 3. Therefore, the apparatus has a simpler structure and higher printing speed than an apparatus having a carriage system. The recording method of the invention is particularly preferbly conducted in such a high-speed printing apparatus.

EXAMPLES

Example 1

Examples of the present invention will be described below, but is not intended to restrict the invention.

<Preparation of Liquids>

The following components are mixed with each other to obtain a predetermined composition, and the mixed liquid is stirred. The liquid is filtered with a filter having a pore size of 5 μm to obtain a desired liquid.

Liquid A: Ink

| | |
|---|---|
| Cabojet-300 having a carboxylate group and available from Cabot Corporation | 4% by mass |
| Styrene-acrylic acid copolymer having an acid value of 100 and a degree of neutralization of 95% | 0.5% by mass |
| Diethylene glycol | 25% by mass |
| Acetylene glycol-ethylene oxide adduct | 0.4% by mass |
| Deionized water | Remaining portion |

Liquid A has a pH value of 7.4, a surface tension of 35 mN/m, and a viscosity of 3.2 mPa·s.

Liquid B: Liquid Composition

| | |
|---|---|
| Diethylene glycol | 30% by mass |
| Magnesium nitrate hexahydrate | 7.5% by mass |
| Acetylene glycol-ethylene oxide adduct | 1% by mass |
| Deionized water | Remaining portion |

Liquid B has a pH value of 5.6, a surface tension of 31 mN/m, and a viscosity of 2.9 mPa·s.

<Evaluation>

In order to print an image, a printing method is conducted in which the liquid composition is ejecdted and then the ink is ejected onto C2 paper (manufactured by Fuji Xerox Co., Ltd.) with a piezo print head serving as a trial product and having 800 nozzles and a resolution of 1,200 dpi. Images are printed while the application amounts of the ink and the liquid composition per unit area are controlled in accordance with Tables 1 and 2. Then, the obtained images are evaluated. These printing processes are carried out under ambient conditions (temperature of 23±0.5° C. and humidity of 55±5% R.H.)

The above-described image printing is conducted according to a printing pattern shown in each of schematic views of FIGS. 4 to 11, and the resultant images are left under the ambient conditions for 24 hours. Then, the images are evaluated. The schematic views of FIGS. 4 to 11 show patterns immediately after the printing.

In the printing pattern of FIG. 4, space created by leaving one dot unformed between a dot of the ink which dot is nearest a liquid composition area and a dot of the liquid composition which dot is nearest an ink area. In the printing pattern of FIG. 5, the application amount of the liquid composition in a boundary portion is changed as shown in Table 1. In the printing pattern of FIG. 6, the application amount of the ink in the boundary portion is changed as shown in Table 1. In the printing pattern of FIG. 7, the application amounts of the liquid composition and the ink in the boundary portions are changed as shown in Table 1. In the printing pattern of FIGS. 8A to 8C, the liquid composition is not applied to the boundary portions of an image area and a non-image area.

Figure 9:
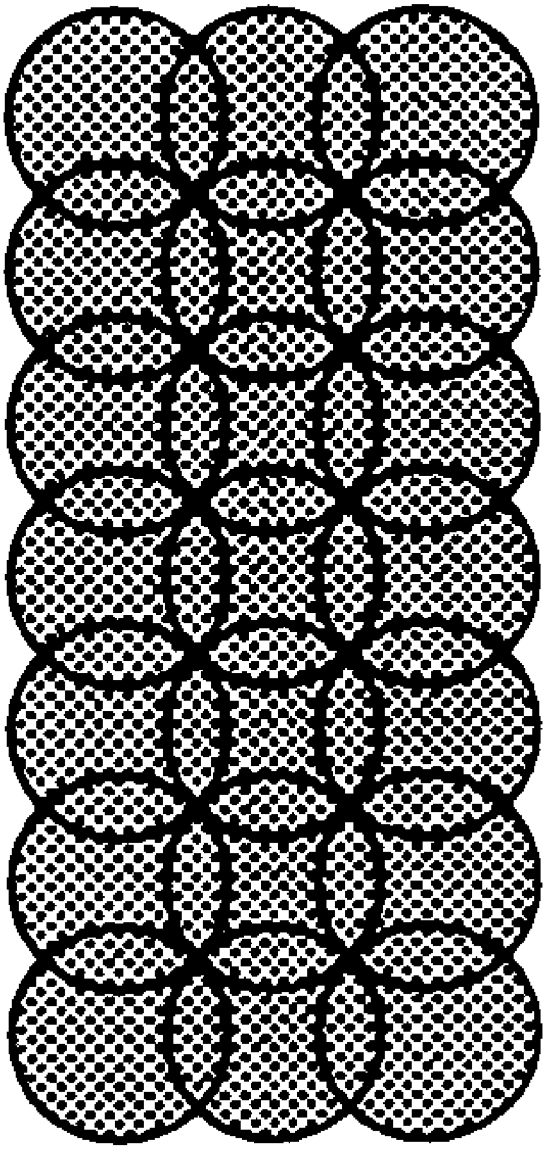
FIG. 9 is a schematic view showing positions and amounts of ejected droplets of an ink and a liquid composition in a comparative example.

Further, in printing pattern of FIG. 9, the ink is applied, but the liquid composition is not applied. In the printing pattern of FIG. 10, a liquid composition area is in contact with an ink area in a boundary. In the printing pattern of FIG. 11, space created by leaving three dots unformed is disposed between a dot of the ink which dot is nearest a liquid composition area and a dot of the liquid composition which dot is nearest an ink area.

In the printing patterns other than that of FIG. 9, the liquid composition is applied to the image area, to which the ink is applied.

The printing pattern, the weight of one droplet of each of the ink and the liquid composition ($D_{liq}$ and $D_{ink}$), and the weight of each of the ink and liquid composition per unit area ($W_{liq}$ and $W_{ink}$) of each sample are shown in Table 1.

It should be noted that the amounts of the droplets are changed by controlling the input waveform of a driving voltage applied to the head.

TABLE 1

Figure 10:
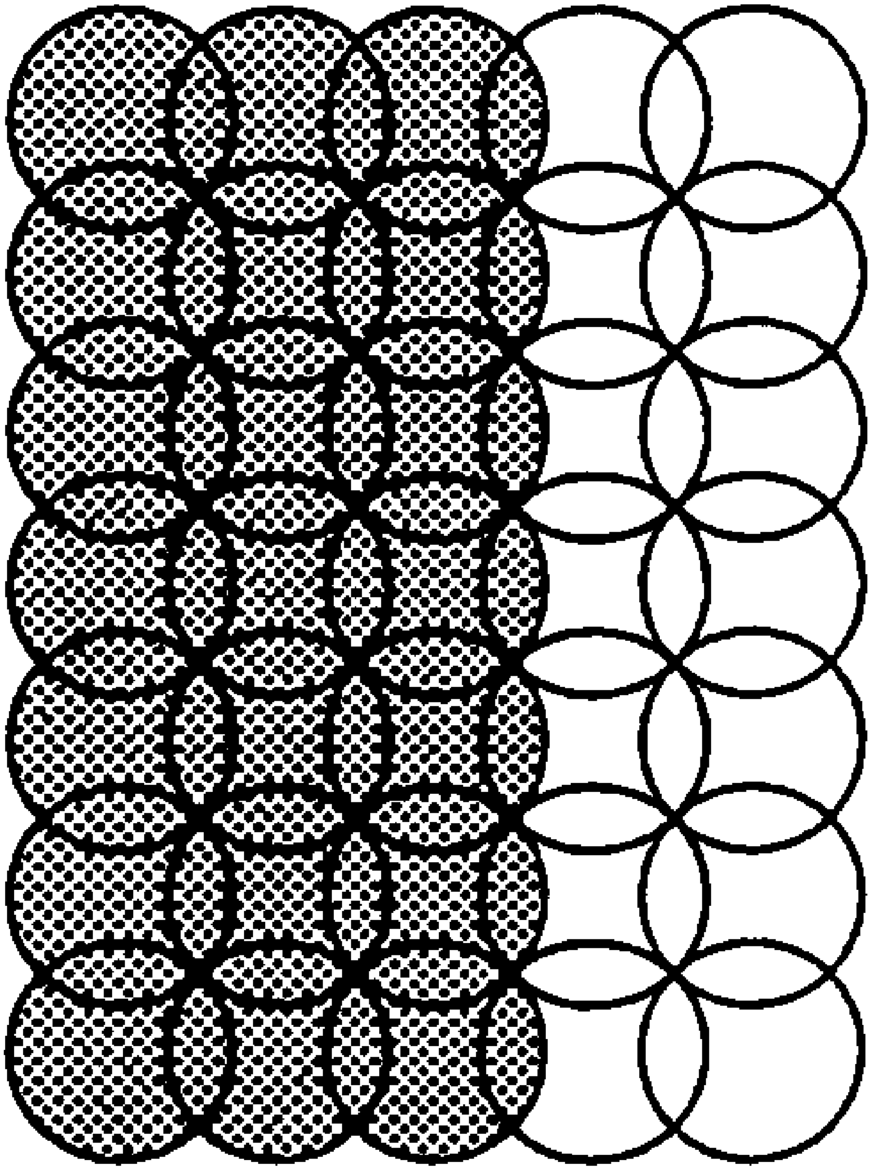
FIG. 10 is a schematic view showing positions and amounts of ejected droplets of an ink and a liquid composition in another comparative example.
Figure 11:
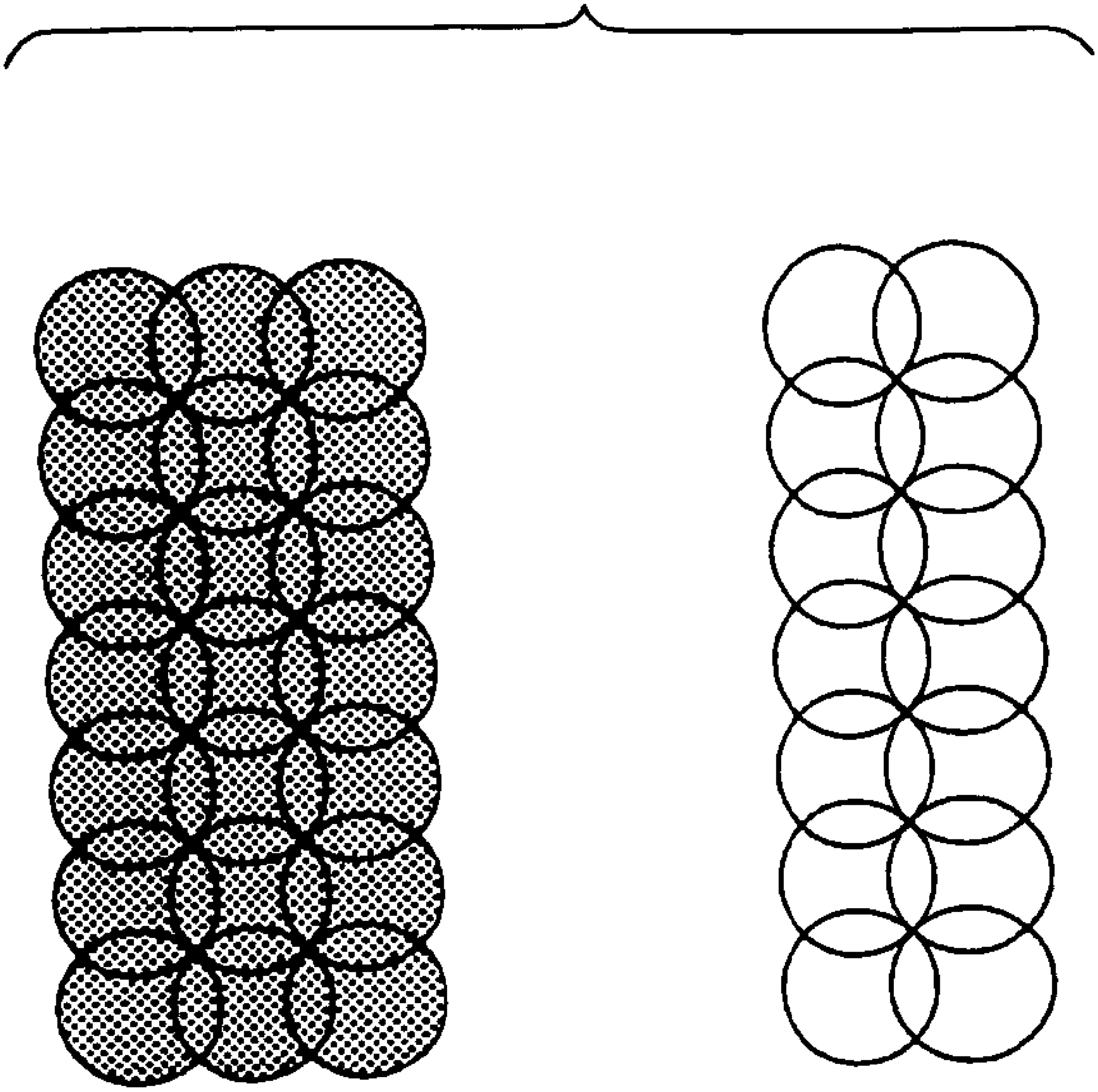
FIG. 11 is a schematic view showing positions and amounts of ejected droplets of an ink and a liquid composition in still another comparative example.

| | Printing pattern of ink and liquid composition | Image boundary portion *1 | Image boundary portion *2 | Amount of droplet (ng) Ink ($D_{ink}$) Boundary portion | Ink ($D_{ink}$) Non-boundary portion | Liquid composition ($D_{liq}$) Non-image area Non-boundary portion | Liquid composition ($D_{liq}$) Non-image area Boundary portion | Liquid composition ($D_{liq}$) Image area Boundary portion | Liquid composition ($D_{liq}$) Image area Non-boundary portion |
|---|---|---|---|---|---|---|---|---|---|
| Sample 1 | FIG. 4 | Not present | Present | 15 | 15 | 5 | — | 5 | 5 |
| Sample 2 | FIG. 5 | Not present | Present | 15 | 15 | 5 | 3 | 5 | 5 |
| Sample 3 | FIG. 6 | Not present | Present | 10 | 15 | 5 | 5 | 5 | 5 |
| Sample 4 | FIG. 7 | Not present | Present | 10 | 15 | 5 | 3 | 5 | 5 |
| Sample 5 | FIG. 8 | Not present | Present | 10 | 15 | 5 | — | — | 5 |
| Sample 6 | FIG. 4 | Not present | Present | 15 | 15 | 5 | — | 3 | 5 |
| Sample 7 | FIG. 4 | Not present | Present | 15 | 15 | 20 | — | 20 | 20 |
| Sample 1-1 | FIG. 10 | Present | Present | 15 | 15 | 5 | 5 | 5 | 5 |
| Sample 1-2 | FIG. 11 | Not present | Not present | 15 | 15 | 5 | 5 | 5 | 5 |
| Sample 2-1 | FIG. 10 | Present | Present | 15 | 15 | 5 | 3 | 5 | 5 |
| Sample 2-2 | FIG. 5 | Not present | Not present | 15 | 15 | 5 | 1 | 5 | 5 |
| Sample 3-1 | FIG. 10 | Present | Present | 10 | 15 | 5 | 5 | 5 | 5 |
| Sample 3-2 | FIG. 6 | Not present | Not present | 5 | 15 | 5 | 5 | 5 | 5 |
| Sample 4-1 | FIG. 10 | Present | Present | 10 | 15 | 5 | 3 | 5 | 5 |
| Sample 4-2 | FIG. 7 | Not present | Not present | 5 | 15 | 5 | 1 | 5 | 5 |
| Sample 5-1 | FIG. 10 | Present | Present | 10 | 15 | 5 | 3 | 5 | 5 |
| Sample 5-2 | FIG. 8 | Not present | Not present | 5 | 15 | 5 | — | — | 5 |
| Sample 6-1 | FIG. 10 | Present | Present | 15 | 15 | 5 | 5 | 3 | 5 |
| Sample 6-2 | FIG. 4 | Not present | Not present | 15 | 15 | 5 | — | 1 | 5 |
| Sample 7-1 | FIG. 9 | — | — | 15 | 15 | — | — | — | — |
| Sample 8 | FIG. 3 | — | — | 15 | 15 | — | — | 5 | 5 |

| | Amounts of ink and liquid composition per unit area (mg/inch2) Ink ($W_{ink}$) Boundary portion | Ink ($W_{ink}$) Non-boundary portion | Liquid composition ($W_{liq}$) Non-image area Non-boundary portion | Liquid composition ($W_{liq}$) Non-image area Boundary portion | Liquid composition ($W_{liq}$) Image area Boundary portion | Liquid composition ($W_{liq}$) Image area Non-boundary portion | Note |
|---|---|---|---|---|---|---|---|
| Sample 1 | 10.8 | 10.8 | 3.6 | — | 3.6 | 3.6 | Example |
| Sample 2 | 10.8 | 10.8 | 3.6 | 2.16 | 3.6 | 3.6 | Example |
| Sample 3 | 7.2 | 10.8 | 3.6 | 3.6 | 3.6 | 3.6 | Example |
| Sample 4 | 7.2 | 10.8 | 3.6 | 2.16 | 3.6 | 3.6 | Example |
| Sample 5 | 7.2 | 10.8 | 3.6 | — | — | 3.6 | Example |
| Sample 6 | 10.8 | 10.8 | 3.6 | — | 2.2 | 3.6 | Example |
| Sample 7 | 10.8 | 10.8 | 14.4 | — | 14.4 | 14.4 | Example |
| Sample 1-1 | 10.8 | 10.8 | 3.6 | 3.6 | 3.6 | 3.6 | Comp. Ex. |
| Sample 1-2 | 10.8 | 10.8 | 3.6 | 3.6 | 3.6 | 3.6 | Comp. Ex. |
| Sample 2-1 | 10.8 | 10.8 | 3.6 | 2.16 | 3.6 | 3.6 | Comp. Ex. |
| Sample 2-2 | 10.8 | 10.8 | 3.6 | 0.72 | 3.6 | 3.6 | Comp. Ex. |
| Sample 3-1 | 7.2 | 10.8 | 3.6 | 3.6 | 3.6 | 3.6 | Comp. Ex. |
| Sample 3-2 | 3.6 | 10.8 | 3.6 | 3.6 | 3.6 | 3.6 | Comp. Ex. |
| Sample 4-1 | 7.2 | 10.8 | 3.6 | 2.16 | 3.6 | 3.6 | Comp. Ex. |
| Sample 4-2 | 3.6 | 10.8 | 3.6 | 0.72 | 3.6 | 3.6 | Comp. Ex. |
| Sample 5-1 | 7.2 | 10.8 | 3.6 | 2.16 | 3.6 | 3.6 | Comp. Ex. |
| Sample 5-2 | 3.6 | 10.8 | 3.6 | — | — | 3.6 | Comp. Ex. |
| Sample 6-1 | 10.8 | 10.8 | 3.6 | 3.6 | 2.2 | 3.6 | Comp. Ex. |
| Sample 6-2 | 10.8 | 10.8 | 3.6 | — | 0.72 | 3.6 | Comp. Ex. |
| Sample 7-1 | 10.8 | 10.8 | — | — | — | — | Comp. Ex. |
| Sample 8 | 10.8 | 10.8 | — | — | 3.6 | 3.6 | Comp. Ex. |

Note
*1: Dot overlap of liquid composition and ink in boundary portion on glossy paper
*2: Dot overlap of liquid composition and ink in boundary portion on plain paper
"—" means that liquid composition is not applied.

Optical density, density unevenness, bleeding, and curling of the obtained samples are evaluated by the following methods.

<<Optical Density>>

The optical density of a printing portion of each of samples having an image printed in accordance with the patterns of FIGS. 4 to 11 is measured with X-RITE 404 manufactured by X-Rite, Inc, and the measured value is evaluated in accordance with the following criteria. When the image of a sample has a portion whose evaluation result is "B" and the other portion whose evaluation result is "A", the sample as a whole is evaluated as "B". This is also applied to evaluation items other than optical density.

-Evaluation Criteria-

A: Optical density is 1.3 or more.

B: Optical density is at least 1.2 and less than 1.3.

C: Optical density is less than 1.2.

<<Density Unevenness>>

The density unevenness of a printed portion is sensorily evaluated by naked eyes in accordance with the following criteria.

-Evaluation Criteria (Black Ink)-

A: Density unevenness is not found.

B: Density unevenness is found but the degree thereof is acceptable.

C: Density unevenness is remarkable and the degree thereof is unacceptable.

<<Bleeding (Feathering)>>

A line having a width which corresponds to one dot is printed, and a sensory check is made to determined whether feathering of the printed portion occurs by comparing the line with a boundary sample.

-Evaluation Criteria (Black Ink)-

S: Feathering hardly occurs.

A: Feathering slightly occurs.

B: Feathering occurs but the degree thereof is acceptable.

C: Feathering remarkably occurs and the degree thereof is unacceptable.

<<Curling>>

A 100% solid image is printed on a postcard-sized recording paper, with a 5-mm margin disposed. The degree of hanging curl, which occurs on a surface of the recording paper opposite to the printed surface, is measured immediately after the printing. The measured values are converted to curvatures and evaluated. The evaluation criteria are shown below, and "S" and "A" are at an acceptable level.

-Evaluation Criteria-

A: Curling slightly occurs.

B: Curling is remarkable.

C: Recording paper rolls.

The evaluation results are shown in Table 2.

TABLE 2

| | Feathering | Optical density | Density unevenness | Curling |
|---|---|---|---|---|
| Sample 1 | A | A | A | A |
| Sample 2 | A | A | A | A |
| Sample 3 | A | A | A | A |
| Sample 4 | A | A | A | A |
| Sample 5 | S | A | A | A |
| Sample 6 | A | A | A | A |
| Sample 7 | A | A | B | B |

TABLE 2-continued

| | Feathering | Optical density | Density unevenness | Curling |
|---|---|---|---|---|
| Sample 1-1 | B | A | A | A |
| Sample 1-2 | C | A | A | A |
| Sample 2-1 | C | A | A | A |
| Sample 2-2 | C | A | A | A |
| Sample 3-1 | B | A | A | A |
| Sample 3-2 | C | A | A | A |
| Sample 4-1 | B | A | A | A |
| Sample 4-2 | C | A | A | A |
| Sample 5-1 | B | A | A | A |
| Sample 5-2 | C | A | A | A |
| Sample 6-1 | C | A | A | A |
| Sample 6-2 | C | A | A | A |
| Sample 7-1 | C | B | A | A |
| Sample 8 | B | A | A | A |

As shown in Table 2, Samples 1 to 7, which are prepared by ejecteng the ink and the liquid composition with the ink jet recording apparatus of the invention in accorndace with the ink jet recording method of the invention, have excellent images with a sufficient optical density and without density unevenness and feathering. Further, Samples 1 to 7 have little curling and good drying condition. In these samples, not only the ink, but also the liquid composition are applied to the image area. Therefore, optical density is high and density unevenness and feathering are further improved. Thus, the samples have remarkably excellent images.

Example 2

The following liquids are used instead of Liquid A (ink) and Liquid B (liquid composition) of Example 1 to print images in the same manner as in samples 1 to 7.

<Pigment Modification Method 1>

Six parts by mass of a salt in which a styrene-methacrylic acid copolymer has been neutralized with an alkali metal is added to 30 parts by mass of carbon black (MOGUL L available from Cabot Corporation). Deionized water is added to the resultant mixture so that the total amount of the resultant becomes 300 parts by mass. Ultrasonic wave is applied to the resultant liquid with an ultrasonic homogenizer to disperse the pigment in a liquid. Then, the resultant dispersion liquid is centrifuged with a centrifugal separator and 100 parts by mass of the obtained residue is removed.

<Pigment Modification Method 2>

100 g of a pigment is added to an aqueous sulfanilic acid solution which is heated and is being stirred. The mixture, which is being stirred, is cooled to room temperature, and 14 g of a concentrated nitric acid is dripped into the mixture. Ten g of an aqueous $NaNO_2$ solution is added to the mixture. The resultant liquid is stirred until the reaction is completed. The obtained pigment is desalted. Deionized water is added to the surface-treated pigment such that the pigment content becomes 12% by mass. Then, the pH value of the mixture is adjusted to 7.5, and the mixture is stirred with an ultrasonic homogenizer. The resultant dispersion liquid is centrifuged at 8,000 rpm for 30 minutes with a centrifugal separator and the resultant residue, the ratio of which to the total amount is 20%, is removed.

Liquid C: Ink

Liquid C is made of the following components in accordance with a predetermined method. The used pigment was treated according to the pigment modification method 1.

| | |
|---|---|
| Mogul L (pigment with no surface functional group, available from Cabot Corporation) | 4% by mass |
| Styrene-methacrylic acid copolymer having an acid value of 250, and a degree of neutralization of 80% | 0.7% by mass |
| Diethylene glycol | 20% by mass |
| Diglycerin-ethylene oxide adduct | 5% by mass |
| Polyoxyethylene-2-ethylhexyl ether | 0.5% by mass |
| Deionized water | Remaining portion |

Liquid C has a pH value of 8.1, a surface tension of 33 mN/m, and a viscosity of 3.2 mPa·s.

Liquid D: Ink

Liquid D is made of the following components in accordance with a predetermined method. The used pigment was treated according to the pigment modification method 2.

| | |
|---|---|
| C.I. Pigment Blue 15:3 (sulfonate group) | 4% by mass |
| Styrene-acrylic acid copolymer having an acid value of 100, and a degree of neutralization of 95% | 0.6% by mass |
| Diethylene glycol | 20% by mass |
| Propylene glycol | 5% by mass |
| Acetylene glycol-ethylene oxide adduct | 1% by mass |
| Deionized water | Remaining portion |

Liquid D has a pH value of 7.4, a surface tension of 32 mN/m, and a viscosity of 3.1 mPa·s.

Liquid E: Ink

Liquid E is made of the following components in accordance with a predetermined method. The used pigment was treated according to the pigment modification method 2.

| | |
|---|---|
| C.I. Pigment Red 122 (sulfonate group) | 5% by mass |
| Styrene-acrylic acid copolymer having an acid value of 100, and a degree of neutralization of 95% | 0.6% by mass |
| Diethylene glycol | 20% by mass |
| Triethylene glycol | 5% by mass |
| Acetylene glycol-ethylene oxide adduct | 1% by mass |
| Deionized water | Remaining portion |

Liquid E has a pH value of 7.6, a surface tension of 31 mN/m, and a viscosity of 3.4 mPa·s.

Liquid F: Liquid Composition

| | |
|---|---|
| C.I. Acid Blue 9 (dye) | 0.01% by mass |
| Diethylene glycol | 30% by mass |
| 1,5-Pentanediol | 5% by mass |
| Diethylene glycol monobutyl ether | 2.5% by mass |
| Acetylene glycol-ethylene oxide adduct | 1% by mass |
| Sodium hydroxide | 0.4% by mass |
| 2-Pyrrolidone-5-carboxylic acid (compound represented by Formula (1)) | 3% by mass |
| Deionized water | Remaining portion |

Liquid F has a pH value of 3.5, a surface tension of 30 mN/m, and a viscosity of 2.8 mPa·s.

Images are printed by combining Liquids C to E (inks) and Liquid F (liquid composition). Images formed by using the ink jet recording method and the ink jet recording apparatus of the invention have sufficient optical density, no density unevenness, no feathering, and only slight curling, as in Example 1.

Example 3

Samples are produced and evaluated in the same manner as in Example 1, except that Liquid A (ink) and Liquid B (liquid composition) of Example 1, and Liquids C to E (ink) and Liquid F (liquid composition) of Example 2 are used and except that an image forming apparatus shown in FIGS. 14 and 15, having a recording head with a width equal to or more than that of a recording medium, and having a piezo print head serving as a trial product and having 2,400 nozzles and a resolution of 600 dpi.

Since the image forming apparatus of FIGS. 14 and 15 prints images at a remarkably high printing speed, As a result, feathering remarkably occurs on samples with printing patterns of comparative examples. However, feathering does not occur on samples with printing patterns according to the invention. This result more clearly shows advantageous effects of the invention.

What is claimed is:

1. An ink jet recording method comprising recording an image on a recording medium with an ink containing a coloring agent and a liquid composition containing a component for coagulating and/or thickening the ink, wherein the ink and the liquid composition are applied to the recording medium such that the ink and the liquid composition are not in contact with each other on the recording medium immediately after the application and come into contact with each other when a certain period of time has elapsed since the application;

wherein the ink is applied to an image area and is not applied to a non-image area, the liquid composition is applied to the non-image area, and the ink or the liquid composition is applied to a boundary portion of the image area or a boundary portion of the non-image area under one of the following conditions (1) to (3):

(1) the liquid composition is not applied to the boundary portion of the non-image area;

(2) the application amount of the liquid composition in the boundary portion is smaller than that in a portion other than the boundary portion; and (3) the application amount of the ink in the boundary portion is smaller than that in a portion other than the boundary portion, or the application amount of the liquid composition in the boundary portion is smaller than that in a portion other than the boundary portion.

2. The ink jet recording method according to claim 1, wherein $D_{ink}$ represents the weight of a droplet of the ink, $D_{liq}$ represents the weight of a droplet of the liquid composition, and $D_{ink}$ and $D_{liq}$ satisfy the expression (1): $0.15<D_{liq}/D_{ink}<1.0$.

3. The ink jet recording method according to claim 1, wherein $W_{ink}$ represents the weight of the ink applied per unit area, $W_{liq}$ represents the weight of the liquid composition applied per unit area, and $W_{ink}$ and $W_{liq}$ satisfy the expression (2): $0.15<W_{liq}/W_{ink}<1.0$.

4. The ink jet recording method according to claim 1, wherein the number of dots of the liquid composition per unit area is larger than that of the ink per unit area.

5. The ink jet recording method according to claim 1, wherein the ink and the liquid composition are ejected while changing the weight of droplets of the ink and/or the weight of droplets of the liquid composition.

6. The ink jet recording method according to claim 5, wherein the weight is changed by controlling the input waveform of a driving voltage to be applied to a head.

7. The ink jet recording method according to claim 1, wherein the ink has a surface tension of 20 to 39 mN/m.

8. The ink jet recording method according to claim 7, wherein the surface tension of the ink is larger than that of the liquid composition.

9. The ink jet recording method according to claim 1, wherein the liquid composition has a surface tension of 15 to 35 mN/m.

10. The ink jet recording method according to claim 9, wherein the ink is ejected after the liquid composition is ejected.

11. The ink jet recording method according to claim 1, wherein the liquid composition contains at least one selected from a polyvalent metal ion and a cationic substance.

12. The ink jet recording method according to claim 1, wherein the liquid composition contains a compound represented by the following formula (1):

Formula (1)

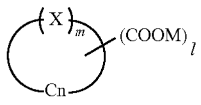

wherein X represents O, CO, NH, NR, S, or $SO_2$; R represents an alkyl group; M represents a hydrogen atom, an alkaline metal, or an amine moiety; l represents an integer from 1 to 5; m represents 1 or 2; and n represents an integer from 3 to 7.

13. The ink jet recording method according to claim 12, wherein the liquid composition contains at least one compound selected from the group consisting of pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, and derivatives and salts thereof, as the compound represented by formula (1).

14. The ink jet recording method according to claim 1, wherein the ink and the liquid composition are ejected from a recording head, and the width of the recording head is equal to or larger than that of the recording medium.

15. The ink jet recording method according to claim 1, wherein the liquid composition is ejected onto an image area onto which the ink is ejected.

16. An ink jet recording apparatus comprising a recording head for applying an ink containing a coloring agent and a liquid composition containing a component for coagulating and/or thickening the ink, to a recording medium, and a unit for controlling the positions of droplets of the ink and the liquid composition such that the ink and the liquid composition are not in contact with each other on the recording medium immediately after the application and come into contact with each other when a certain period of time has lapsed since the application, wherein the ink is applied to an image area and is not applied to a non-image area, the liquid composition is applied to the non-image area, and the ink or the liquid composition is applied to a boundary portion of the image area or a boundary portion of the non-image area under one of the following conditions (1) to (3): (1) the liquid composition is not applied to the boundary portion of the non-image area; (2) the application amount of the liquid composition in the boundary portion is smaller than that in a portion other than the boundary portion; and (3) the application amount of the ink in the boundary portion is smaller than that in a portion other than the boundary portion or the application amount of the liquid composition in the boundary portion is smaller than that in a portion other than the boundary portion.

17. An ink jet recording apparatus, comprising a recording head for applying an ink containing a coloring agent and a liquid composition containing a component for coagulating and/or thickening the ink, to a recording medium, and a unit for controlling the positions of droplets of the ink and the liquid composition such that the ink is applied to an image area and is not applied to a non-image area, the liquid composition is applied to the non-image area, and the ink or the liquid composition is applied to a boundary portion of the image area or a boundary portion of the non-image area under one of the following conditions (1) to (3):

(1) the liquid composition is not applied to the boundary portion of the non-image area;

(2) the application amount of the liquid composition in the boundary portion is smaller than that in a portion other than the boundary portion; and (3) the application amount of the ink in the boundary portion is smaller than that in a portion other than the boundary portion, or the application amount of the liquid composition in the boundary portion is smaller than that in a portion other than the boundary portion.

18. The ink jet recording apparatus according to claim 16, wherein the width of the recording head is equal to or larger than that of the recording medium.

* * * * *